US008411813B2

(12) United States Patent
Aoki

(10) Patent No.: US 8,411,813 B2
(45) Date of Patent: Apr. 2, 2013

(54) METHOD FOR CARRYING OUT REACTOR INTERNAL

(75) Inventor: Masataka Aoki, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 616 days.

(21) Appl. No.: 12/494,436

(22) Filed: Jun. 30, 2009

(65) Prior Publication Data
US 2009/0323883 A1    Dec. 31, 2009

(30) Foreign Application Priority Data

Jun. 30, 2008    (JP) ................................. 2008-169831

(51) Int. Cl.
G21C 19/00    (2006.01)
(52) U.S. Cl. ........ 376/260; 376/263; 376/268; 376/272; 376/287
(58) Field of Classification Search .................. 376/260, 376/263, 268, 272, 287
See application file for complete search history.

(56) References Cited

U.S. PATENT DOCUMENTS

| | | | | |
|---|---|---|---|---|
| 5,227,123 A | * | 7/1993 | Baversten | 376/260 |
| 5,301,212 A | * | 4/1994 | Jacquier et al. | 376/260 |
| 5,828,713 A | * | 10/1998 | Schmidt et al. | 376/260 |
| 6,198,787 B1 | * | 3/2001 | Hasegawa et al. | 376/260 |
| 6,549,601 B1 | * | 4/2003 | Aoki et al. | 376/260 |

FOREIGN PATENT DOCUMENTS

| | | |
|---|---|---|
| JP | 62-285100 | 12/1987 |
| JP | 08-152495 | * 6/1996 |
| JP | 08-240693 | 9/1996 |
| JP | 2000-046983 | 2/2000 |
| JP | 2001-021689 | 1/2001 |
| JP | 2002-131483 | 5/2002 |
| WO | WO 00/60607 | 10/2000 |

* cited by examiner

Primary Examiner — Jack W Keith
Assistant Examiner — Marshall O'Connor
(74) Attorney, Agent, or Firm — Antonelli, Terry, Stout & Kraus, LLP.

(57) ABSTRACT

A method for carrying out a reactor internal, comprising steps of:
  forming a first opening portion in a ceiling of a reactor building at a position directly above an equipment pool in said reactor building;
  cutting a cylindrical reactor internal surrounding a core in a reactor pressure vessel disposed in said reactor building, at one position in an axial direction;
  surrounding said cut cylindrical reactor internal with a radiation shield; and
  carrying out said cylindrical reactor internal surrounded by said radiation shield out of said reactor building through said first opening portion.

11 Claims, 41 Drawing Sheets

METHOD FOR CARRYING OUT REACTOR INTERNAL

CLAIM OF PRIORITY

The present application claims priority from Japanese Patent application serial no. 2008-169831, filed on Jun. 30, 2008, the content of which is hereby incorporated by reference into this application.

BACKGROUND OF THE INVENTION

The present invention relates to a method for carrying out a reactor internal and, more particularly, to a method for carrying out a reactor internal suitable for carrying out a core shroud in a reactor pressure vessel (hereinafter referred to as an RPV) in a boiling water reactor nuclear power plant (hereinafter referred to as a BWR plant).

In the BWR plant, a nuclear reactor has a core disposed in the RPV. A plurality of fuel assemblies including nuclear fuel material are loaded in the core, and an annular core shroud provided in the RPV surrounds the core. In the BWR plant, operation of the BWR plant is periodically shut down for maintenance and inspection. The core shroud, which is a reactor internal, is also is an object of the maintenance and inspection. If damage such as a crack is found in the core shroud or if replacement of the core shroud is desired from the viewpoint of preventive maintenance, the core shroud in the RPV is replaced to a new core shroud.

Japanese Patent Laid-open No. 8-240693 states one way to carry an existing core shroud out of a RPV to replace with a new core shroud. In the method for carrying out a core shroud disclosed in Japanese Patent Laid-open No. 8-240693, the core shroud is coarsely cut up in the RPV filled with cooling water, these cut pieces are further cut up into finer pieces in a reactor well filled with the cooling water, then, the fine pieces are packed into a container, and this container is carried out. However, the method for carrying out the core shroud disclosed in Japanese Patent Laid-open No. 8-240693 requires two steps of coarse cutting and fine cutting of the core shroud, and takes long time to carry out the core shroud.

Methods for carrying out a core shroud to solve this problem are described in Japanese Patent Laid-open No. 2000-46983 and WO 00/60607. These methods for carrying out a core shroud deal with a core shroud inside a RPV in a BWR plant.

In Japanese Patent Laid-open No. 2000-46983, a cut core shroud is, without being cut up into small pieces, carried out through an opening portion formed in a ceiling of a reactor building by using a crane. This method for carrying out the core shroud will be more precisely explained. After operation of the reactor was shut down, a top head of the RPV is removed and a steam dryer and a stream separator in the RPV are taken out from the RPV into an equipment pool. Furthermore, fuel assemblies in the core are taken out into a fuel storage pool. The core shroud is cut below a core plate, and surrounded by a cask which is a radiation shield. The cask storing the core shroud is lifted by the crane, and carried out of the reactor building through the opening portion formed in the ceiling of the reactor building. Afterward, a new core shroud hoisted by the crane is carried inside the reactor building through the opening portion in the ceiling, and disposed to a predetermined position in the RPV.

WO 00/60607 also states a method for carrying out a core shroud in which method, a core shroud cut below a core plate and surrounded by a radiation shield is carried out of a reactor building through an opening portion formed in a ceiling of a reactor building. In this carry method, various parts such as removed jet pumps and cut pipes to be carried out are stored inside the core shroud above the core plate disposed in the core shroud, and the core shroud along with these parts are carried out of the reactor building.

Japanese Patent Laid-open No. 2002-131483 discloses a carry method in which a reactor including a core shroud is hoisted by a crane and carried out of a reactor building through an opening portion formed in a ceiling of the reactor building. In this method for carrying out a reactor, a protection device is disposed inside a reactor well to prevent the upset of the reactor being carried out of the reactor building to the fuel storage pool side, and the reactor is carried out through the protection device.

SUMMARY OF THE INVENTION

The methods for carrying out a core shroud disclosed in Japanese Patent Laid-open No. 2000-46983 and WO 00/60607 do not require fine cutting of the core shroud. Thus, their methods can reduce the time required for carrying out the core shroud than the carry method disclosed in Japanese Patent Laid-open No. 8-240693. However, in the methods for carrying out a core shroud disclosed in Japanese Patent Laid-open No. 2000-46983 and WO 00/60607, safety must be improved to prevent the core shroud from falling into the fuel storage pool storing the fuel assemblies when the core shroud is being carried out. This would be expected to carry out the core shroud through a protection device set up in a reactor well or on an operation floor by applying the protection device disclosed in Japanese Patent Laid-open No. 2002-131483 to the method for carrying out a core shroud disclosed in Japanese Patent Laid-open No. 2000-46983 or WO 00/60607.

There is an idea of transferring all the fuel assemblies in the fuel storage pool to a fuel storage pool in another BWR plant to avoid the fuel assemblies in the fuel storage pool from being damaged by the hoisted core shroud falling on them. This idea requires about 30 days for transferring the fuel assemblies. Thus, the preparatory operation for carrying out the core shroud takes long time, and consequently, it requires long time to complete the carrying out of the core shroud.

The method for carrying out a core shroud described in Japanese Patent Laid-open No. 2000-46983 or WO 00/60607 with the above-mentioned protection device applied to the method, can reduce the time required for carrying the core shroud out of the reactor building than the method in which the fuel assemblies are transferred to a fuel storage pool in another BWR plant. However, it takes time to set up a strong protection device for preventing the core shroud from falling.

An object of the present invention is to provide a method for carrying out a reactor internal for being able to increase safety during carrying out the reactor internal and further reduce the time required for carry operation.

A feature of the present invention to achieve the above object comprises steps of: forming an opening portion in a ceiling of a reactor building at a position directly above an equipment pool in the reactor building; cutting a cylindrical reactor internal surrounding a core in a reactor pressure vessel at one position in an axial direction; surrounding the cut cylindrical reactor internal with a radiation shield; and carrying the cylindrical reactor internal surrounded by the radiation shield out of the reactor building through the opening portion.

Since the cut cylindrical reactor internal is carried out through the opening portion formed directly above the equipment pool which is far from a fuel storage pool, the cylindrical reactor internal can be prevented from falling into the fuel storage pool storing fuel assemblies during carrying out the cylindrical reactor internal. This improves safety during carrying out the cylindrical reactor internal. In addition, since neither transfer of the fuel assemblies in the fuel storage pool nor the setting of the protection device for preventing the cylindrical reactor internal from falling into the fuel storage pool is necessary when the cylindrical reactor internal is carried out, the time period required for carrying out the cylindrical reactor internal can be further reduced.

A feature of another invention comprises steps of: cutting a cylindrical reactor internal surrounding a core in a reactor pressure vessel installed in a reactor building, at one position in the axial direction; taking out the cut cylindrical reactor internal from the reactor pressure vessel; supporting the taken out cylindrical reactor internal by a flange portion of the reactor pressure vessel; surrounding the cylindrical reactor internal supported by the flange portion by the radiation shield; and carrying out the cylindrical reactor internal surrounded by the radiation shield from the reactor building.

Since the cylindrical reactor internal supported by the flange portion is surrounded by the radiation shield, the weight of the cylindrical reactor internal and the radiation shield can be supported by the reactor pressure vessel. This eliminates the need of setting up a new support member for supporting the weight of the radiation shield. Thus, the time period required for carrying out the cylindrical reactor internal can be further reduced.

According to the present invention, safety during the carrying out the cylindrical reactor internal in the reactor pressure vessel can be improved and the time required for the carry operation can be further reduced.

DETAILED DESCRIPTION OF THE PREFERRED EMBODIMENTS

Various embodiments of the present invention will now be described below.

First Embodiment

Figure 2:
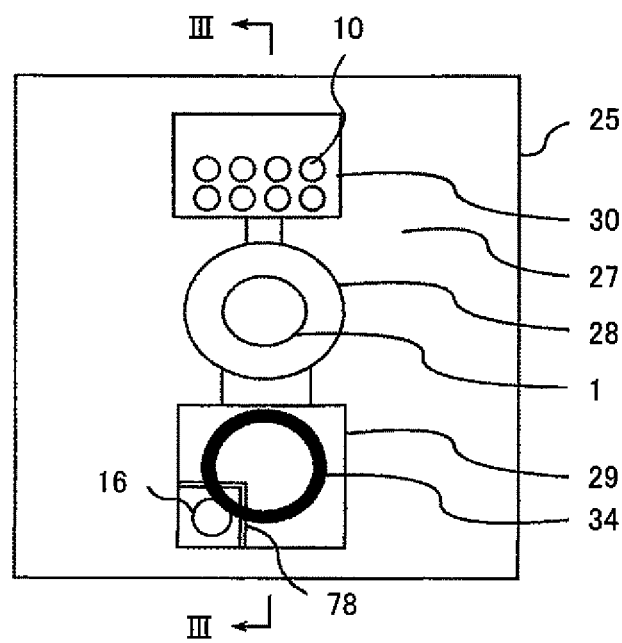
FIG. 2 is an explanatory drawing showing arrangement of each pool on an operation floor in a reactor building in a boiling water reactor nuclear power plant to which the method for carrying out a reactor internal according to first embodiment is applied, and an opening portion formed in a ceiling of the reactor building in step S2 shown in FIG. 1.
Figure 3:
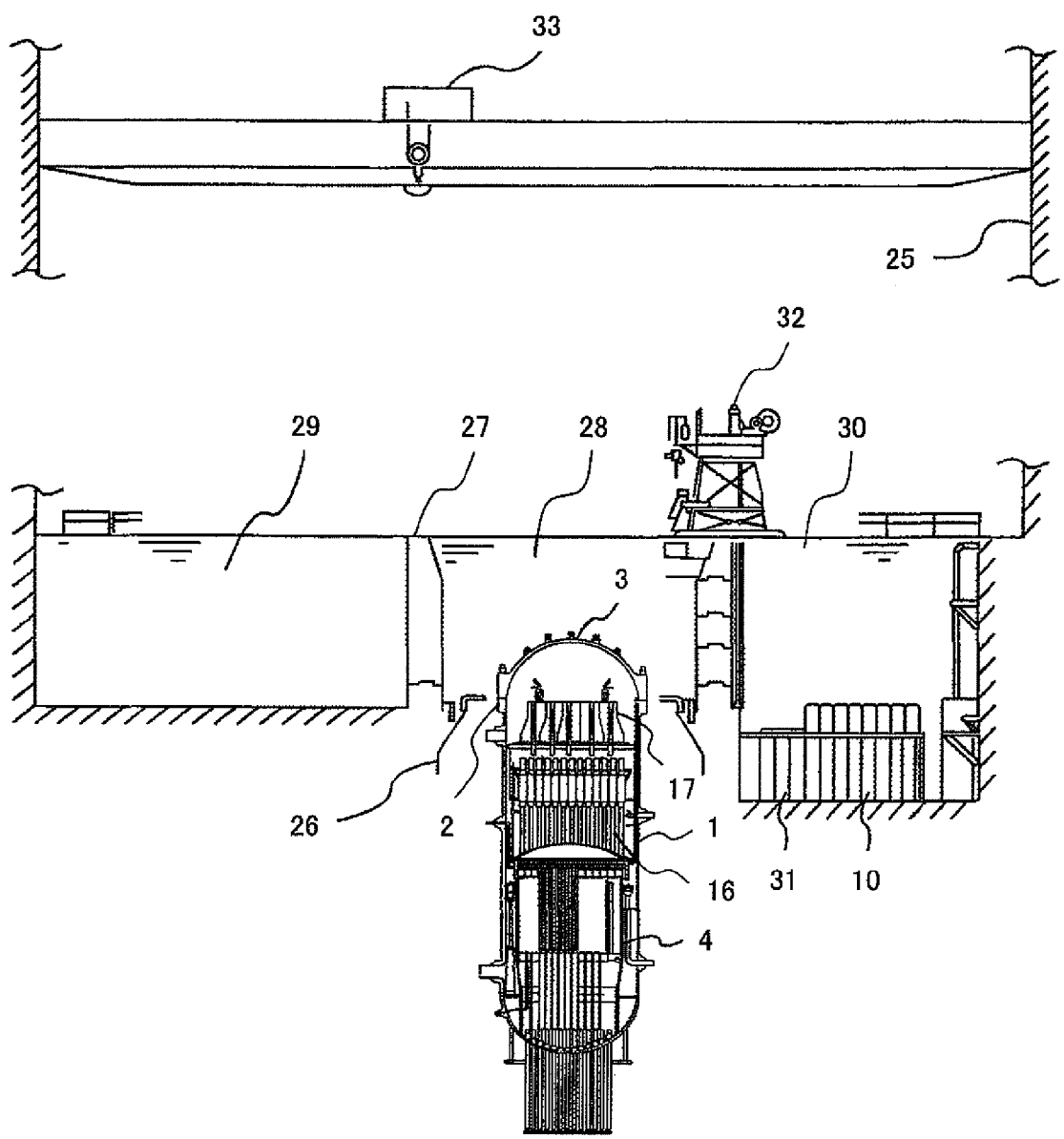
FIG. 3 is a sectional view taken along a line III-III of FIG. 2.
Figure 4:
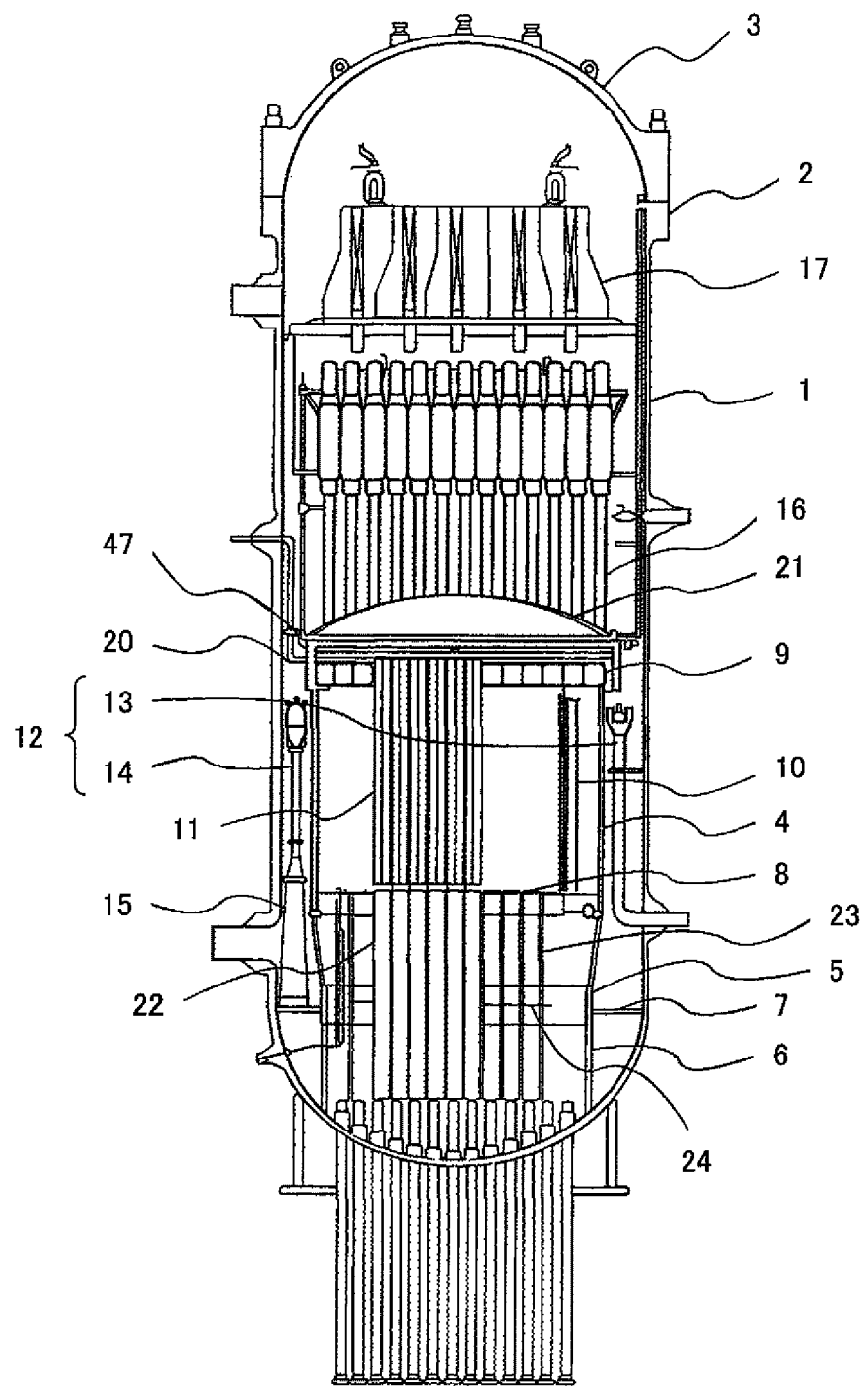
FIG. 4 is a longitudinal sectional view showing a reactor in a boiling water reactor nuclear power plant.

A method for carrying out a reactor internal according to the first embodiment, which is a preferred embodiment of the present invention, will be described below with reference to figures. First, general structure of a BWR plant to which the carry method is applied will be explained with reference to FIGS. 2, 3, and 4.

The BWR plant has a reactor containment vessel (hereinafter referred to as a PCV) 26 installed in a reactor building 25 and a reactor provided in the PCV 26. This reactor is a boiling water reactor. A reactor well 28, an equipment pool 29, and a fuel storage pool 30 are disposed above the PCV 26 in the reactor building 25. The reactor well 28 is located directly above the reactor. The equipment pool 29 and the fuel storage pool 30 are located on both sides of the reactor well 28, and each of these pools is connected to the reactor well 28. An operation floor 27 is formed in the upper portion of the reactor building 25, surrounding the reactor well 28, the equipment pool 29, and the fuel storage pool 30. A ceiling crane 33 is disposed above the operation floor 27 inside the reactor building 25. A fuel exchanger 32 is movably installed on the operation floor 27 over the reactor well 28.

The reactor of the BWR plant has a reactor pressure vessel (hereinafter referred to as an RPV) 1, a core loaded with a plurality of fuel assemblies 10, a core shroud (a cylindrical reactor internal) 4 surrounding the core, and a plurality of control rods 11 to be inserted between the fuel assemblies 10 and withdrawn from between the fuel assemblies 10. The core, the core shroud 4, and the control rods 11 are disposed in the RPV 1. A core plate 8 and a top guide 9 disposed in the core shroud 4 are attached to the core shroud 4. The core plate 8 supports the lower end portions of the fuel assemblies 10, and the top guide 9 supports the upper end portions of the fuel assemblies 10. A plurality of control rod guide pipes 22 provided below the core plate 8 function as a guide for each control rod 11. A plurality of in-core flux monitor guide pipes 23 disposed between the control rod guide pipes 22 are connected by in-core stabilizers 24.

The core shroud 4 is fixed to a shroud support cylinder 5, and the shroud support cylinder 5 is installed on the inside bottom surface of the RPV 1 by shroud support legs 6. A baffle plate 7 installed to the inner surface of the RPV 1 in the horizontal direction is also fixed to the shroud support cylinder 5.

A plurality of jet pumps 12 are disposed in an annular space formed between the RPV 1 and the core shroud 4, and installed to the baffle plate 7. Each jet pump 12 has a jet pump riser 13, an inlet mixer 14, and a diffuser 15. Each diffuser 15 is installed to the baffle plate 7.

A shroud head 21 above the core is installed to the upper end portion of the core shroud 4. A steam separator 16 extends upward from the shroud head 21, and a steam dryer 17 is disposed above the steam separator 16. The steam separator 16 and the steam dryer 17 are disposed in the RPV 1. A core spray sparger 20 is installed to the shroud head 21.

Figure 1:
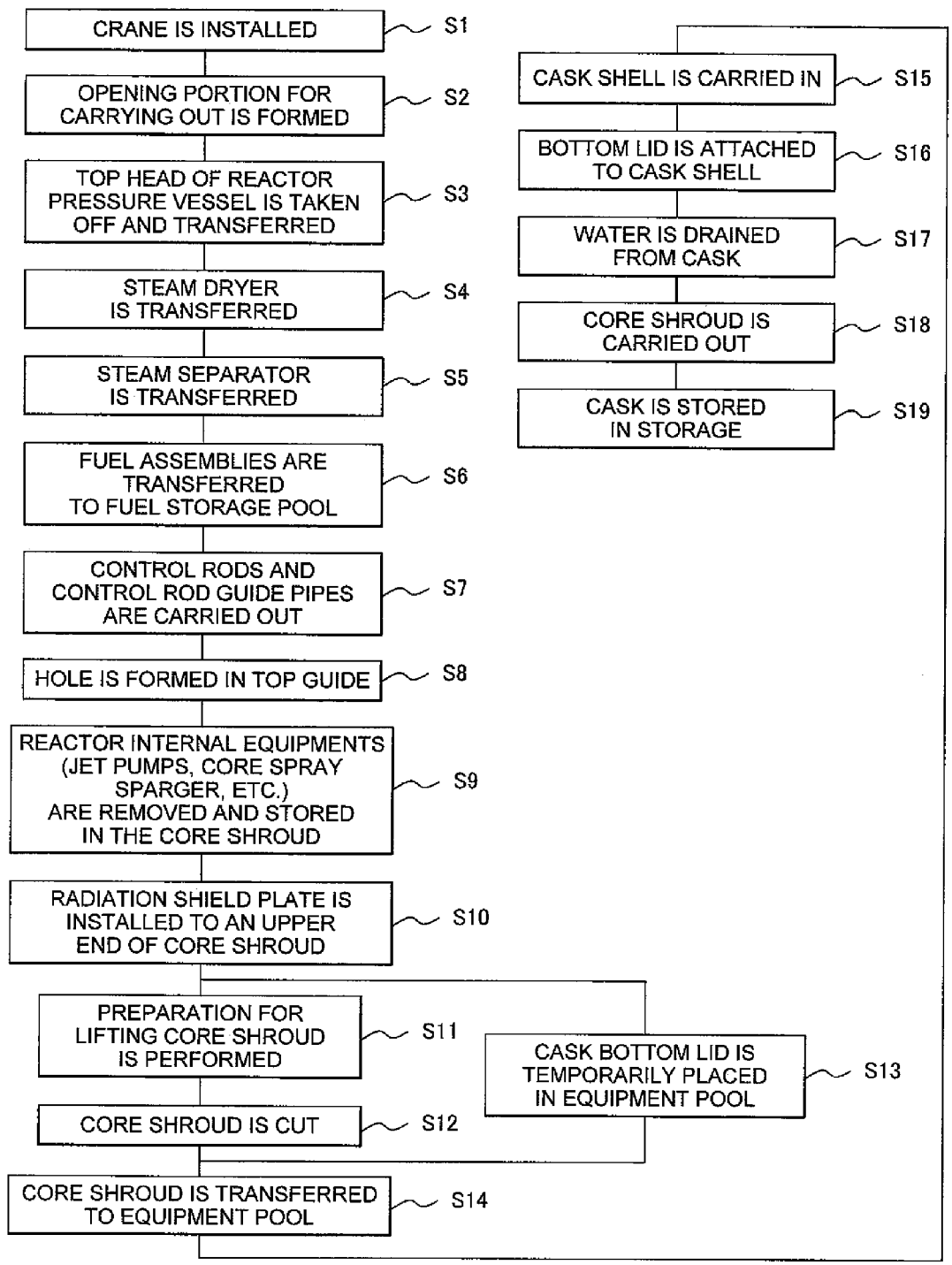
FIG. 1 is a flowchart showing operation procedures of a method for carrying out a reactor internal according to first embodiment which is a preferred embodiment of the present invention.

The method for carrying out a reactor internal of the present embodiment is described using, as an example, a carrying out operation of the core shroud 4, which is performed as part of a replacement operation of the core shroud 4. This method for carrying out a reactor internal is performed based on the steps shown in FIG. 1, and each operation of steps S1 to S19 is sequentially executed.

A crane is installed (step S1). A crane (a first transfer apparatus) 18 for hoisting the steam dryer 17, the steam separator 16, the core shroud 4, and so on provided in the RPV 1, out of the reactor building 25 (see FIG. 7) is installed on the ground (or on a road) outside the reactor building 25. An opening portion is formed in a ceiling of the reactor building 25 (step S2). An opening portion 34 for carrying out the core shroud 4 (see FIGS. 2 and 7) is formed in a ceiling 37 of the reactor building 25 directly above the equipment pool 29 (see FIG. 7). An openable and closable shutter 35 covers the opening portion 34, and is movably attached to the ceiling (see FIG. 7). The shutter 35 is opened when equipment is carried in or out through the opening portion 34, or else it is closed. In addition, the opening portion 34 is provided with an air curtain to prevent radioactive material from escaping outside the reactor building 25 through the opening portion 34 when the shutter 35 is open.

A top head of the RPV is transferred onto the operation floor (step S3). A top head 3 is attached with a plurality of bolts to a flange 2 located at the upper part of the RPV 1. Before the top head 3 is removed, the reactor well 28 and the equipment pool 29 are filled with water to shield radiation. The bolts are removed, and the top head 3 is hoisted by the ceiling crane (a second transfer apparatus) 33 to be transferred onto the operation floor 27 through the reactor well 28. The top head 3 is covered with a sheet to prevent any radioactive material from scattering, and kept on the operation floor 27.

The steam dryer is transferred (step S4). The steam dryer 17 in the RPV 1 is hoisted by the ceiling crane 33 and removed from the RPV 1. This steam dryer 17 is transferred into the equipment pool 29 by the ceiling crane 33 and temporarily placed on the bottom of the equipment pool 29. The steam separator is transferred (step S5). The shroud head 21 on which the steam separator 16 is fixed is removed from the core shroud 4. The steam separator 16 together with the shroud head 21 is hoisted by the ceiling crane 33, removed from the RPV 1, and transferred to the equipment pool 29. This steam separator 16 and the shroud head 21 are placed on the bottom of the equipment pool 29 at a corner of the equipment pool 29. This corner is one of the corners farthest from the reactor well 28 among the four corners of the equipment pool. The steam dryer 17 placed inside the equipment pool 29 is stacked on top of the steam separator 16. Then, a separation wall 78 having two orthogonal sides (see FIG. 2) is disposed by the ceiling crane 33 around the stacked steam separator 16 and steam dryer 17. The top head 3, the steam dryer 17, the steam separator 16, etc. are surrounded by two sides of the equipment pool 29 and the two sides of the separation wall 78. A radiation shield provided to the separation wall 78 (not shown) covers the upper part of the steam separator 16 disposed in the separation wall 78. This radiation shield extends from the top end of the two side walls of the separation walls 78 to the half of the height of each side wall.

The fuel assemblies are transferred to the fuel storage pool (step S6). A gripper (not shown) of the fuel exchanger 32 grips the fuel assembly 10 loaded to the core. The fuel assembly 10 taken out of the RPV 1 by the fuel exchanger 32 is lifted inside the reactor well 29, transferred into the fuel storage pool 30, and stored in a storage rack 31 in the fuel storage pool 30. All the fuel assemblies in the core are stored in the storage rack 31. The control rods and the control rod guide pipes are carried out (step S7). The control rods 11 inserted into the core are stored in the equipment rack (not shown) disposed in the fuel storage pool 30 by the fuel exchanger 32 in the same manner as the fuel assemblies 10. The control rod guide pipes 22 in the RPV 1 are also removed from the RPV 1 by the fuel exchanger 32 and stored in the above equipment rack.

Figure 5:
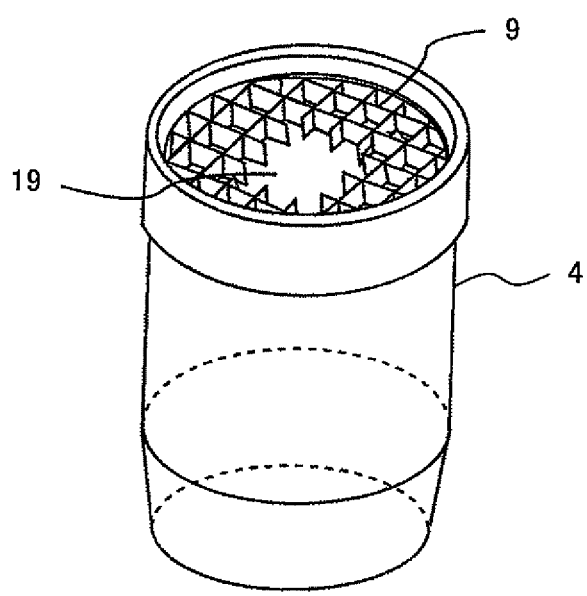
FIG. 5 is an explanatory drawing showing a top guide having a hole formed in step S8 shown in FIG. 1.
Figure 6:
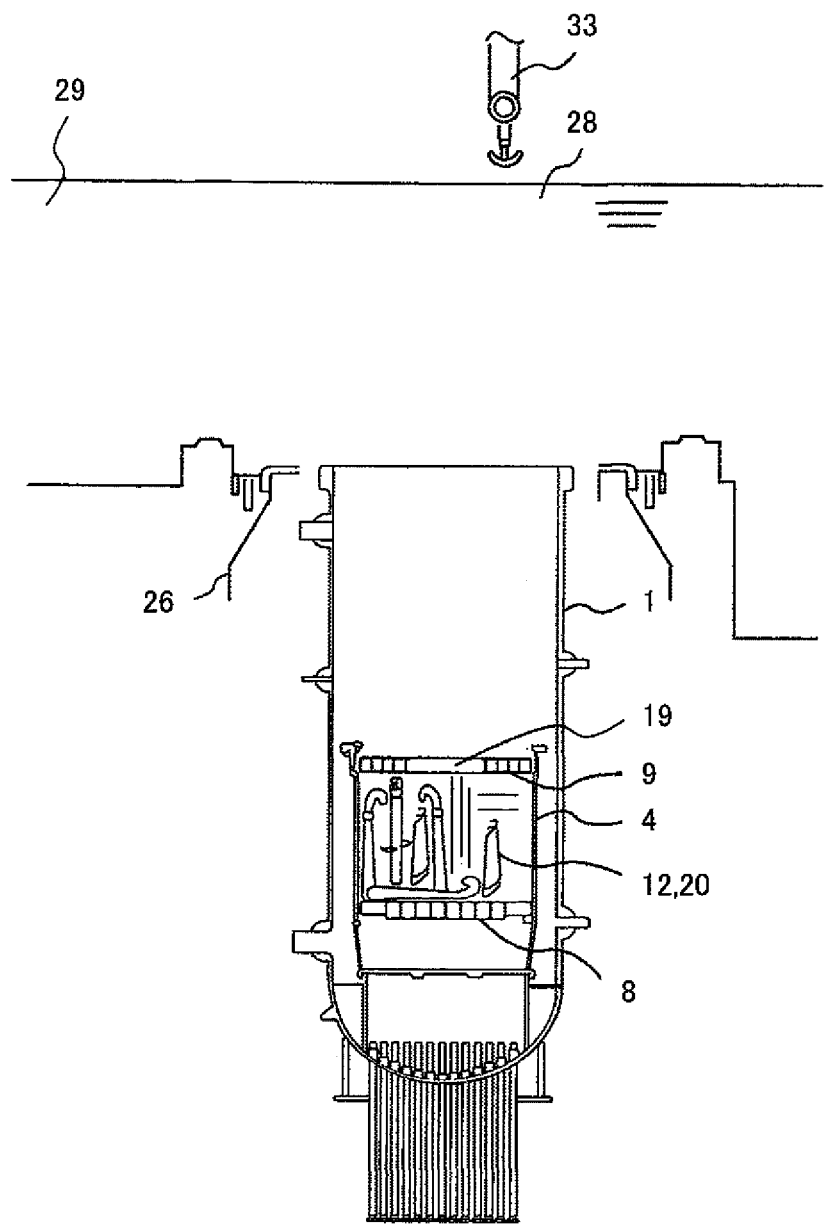
FIG. 6 is an explanatory drawing showing a state of storing reactor internal equipments and piping in a core shroud in step S9 shown in FIG. 1.

A hole is formed in the top guide (step S8). As shown in FIG. 5, a part of a guide member of the top guide 9 provided to the core shroud 4 is removed, and a hole 19 is formed in the top guide 9. The hole 19 should be large enough for putting the removed jet pumps 12, the spray sparger 20, etc. into the core shroud 4. Reactor internal equipments are stored in the core shroud (step S9). The jet pumps 12 provided in the RPV 1 are taken out by separately removing the jet pump risers 13, the inlet mixers 14 and the diffusers 15, and the removed pieces of the jet pump 12 are stored in the core shroud 4 through the hole 19. The core spray sparger 20 is also removed and stored in the core shroud 4. Piping connected to the core spray sparger 20 is also cut and stored in the core shroud 4 through the hole 19. FIG. 6 shows a state in which these reactor internal equipments and piping are stored in the core shroud 4. The ceiling crane 33 is used to store the removed jet pump risers 13, the core spray sparger 20, etc. into the core shroud 4.

Figure 7:
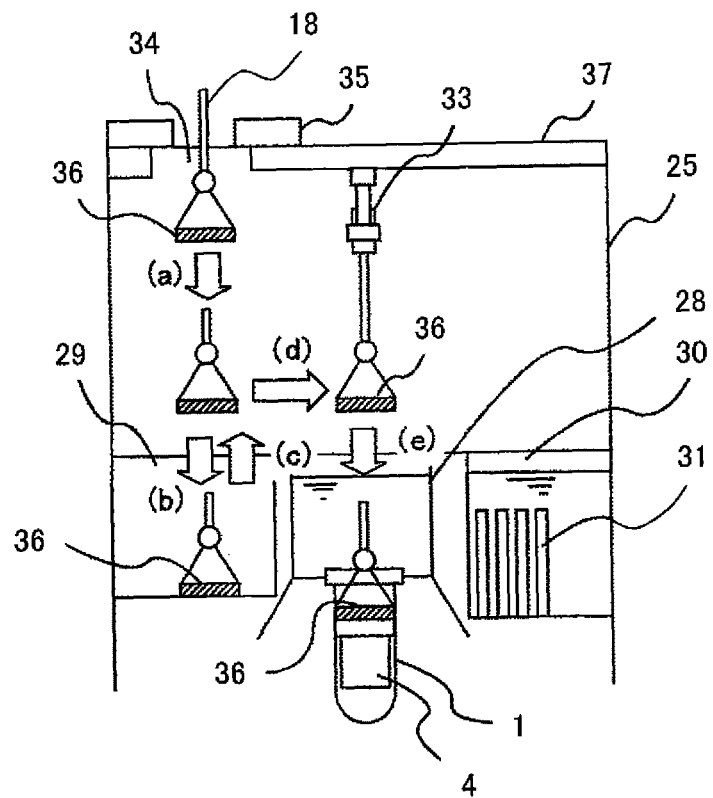
FIG. 7 is an explanatory drawing showing a state of carrying a radiation shield plate to a core shroud in step S10 shown in FIG. 1.
Figure 8:
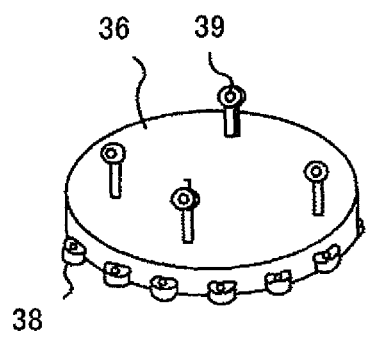
FIG. 8 is an enlarged perspective view showing a radiation shield plate shown in FIG. 7.
Figure 9:
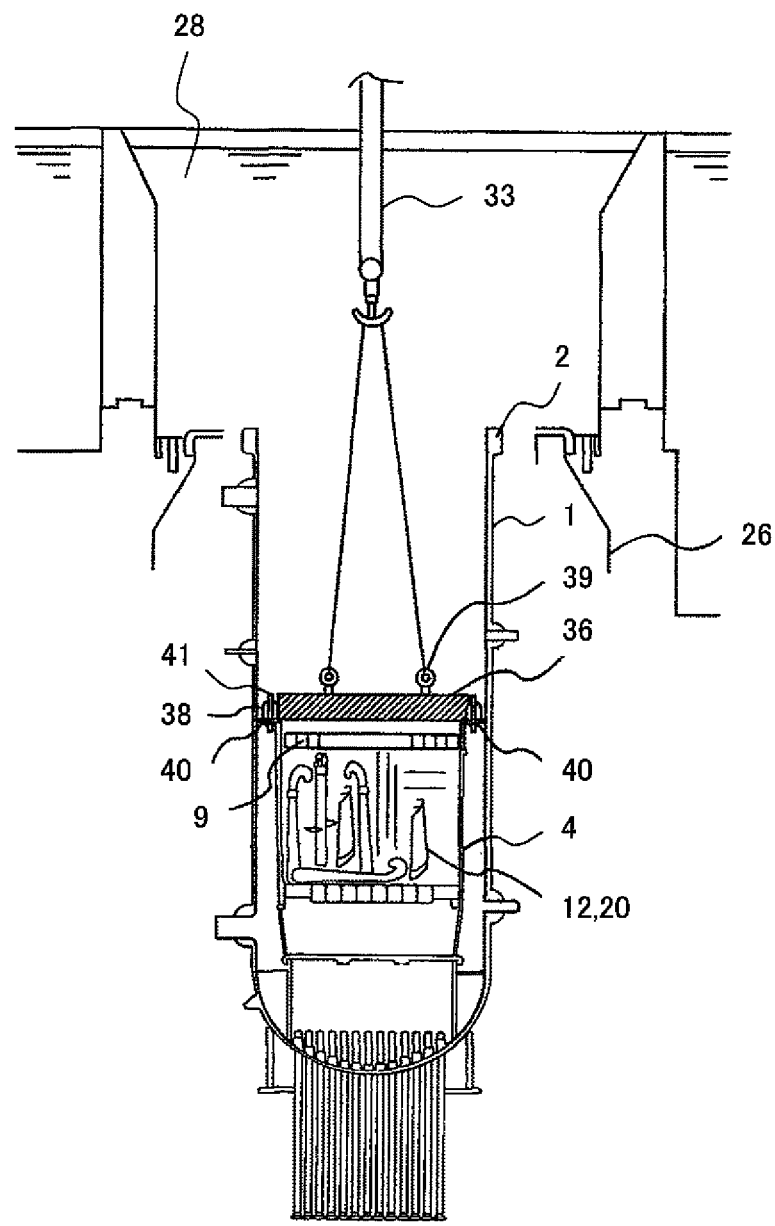
FIG. 9 is an explanatory drawing showing a state in which the radiation shield plate shown in FIG. 7 fixed onto an upper end of a core shroud.
Figure 10:
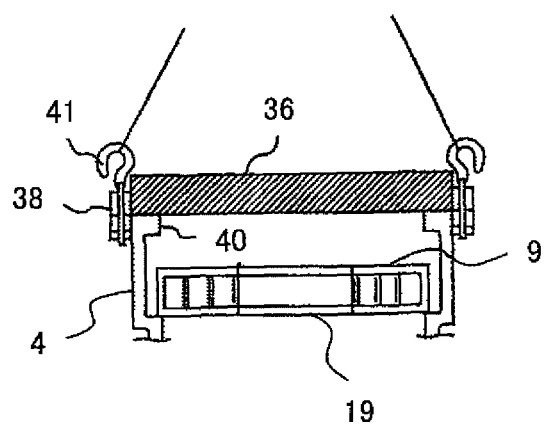
FIG. 10 is an explanatory drawing showing a state in which wires attached to a crane are re-attached to hoist bolts of the radiation shield plate in step S11 shown in FIG. 1.

A radiation shield plate is installed on an upper end of the core shroud (step S10). The shutter 35 is opened as shown in FIG. 7, and a radiation shield plate 36 is carried, using the crane 18, in the reactor building 25 through the opening portion 34 in the ceiling 37 ((a) of FIG. 7). The radiation shield 36 has, as shown in FIG. 8, a plurality of hoist bolts 39 protruding upward and a plurality of ribs 38, each having a through-hole, around the shield 36. The radiation shield 36 is hoisted by the crane 18 with wires attached to the hoist bolts 39. This radiation shield 36 is temporarily placed in the equipment pool 29 ((b) of FIG. 7). The radiation shield 36 is then lifted by the ceiling crane 33 ((c) of FIG. 7), transferred from the equipment pool 29 to the reactor well 28 ((d) of FIG. 7), and lowered in the reactor well 28 ((e) of FIG. 7) to be set on the upper end of the core shroud 4 in the RPV 1. FIG. 9 shows a state in which the radiation shield 36 is set on an upper end ring 40 that is the upper end of the core shroud. The radiation shield 36 is attached to the upper end ring 40 with hoist bolts 41. Preparation for lifting the core shroud is performed (step S11). Wires are removed from the hoist bolts 39 attached to the radiation shield 36 and re-attached to the hoist bolts 41 attached to the radiation shield 36. The hoist bolts 41 combines the radiation shield 36 with the core shroud 4. The wires are attached to the ceiling crane 33 in order to hang the core shroud 4 (see FIG. 10). The ceiling crane 33 is operated to pull the wires to the extent that they are not slack. The core shroud is cut (step S12). While the wires are stretched, the core shroud 4 is cut from outside. The cutting position of the core shroud 4 is lower than the core plate 8, higher than the baffle plate 7 and at one position in the axial direction of the core shroud 4. Preferably, the cutting position is close to the baffle plate 7. At this cutting position, the core shroud 4 is cut in a circumferential direction. Since the wires are stretched, the core shroud 4 is prevented from tipping or falling during or after the cutting of the core shroud 4.

Figure 11:
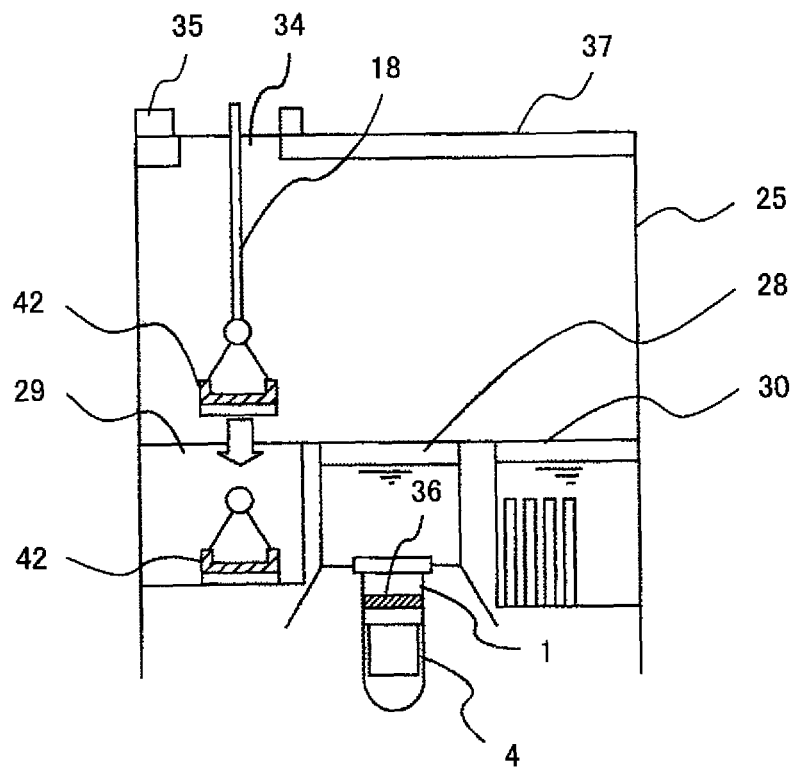
FIG. 11 is an explanatory drawing showing a state in which a cask bottom lid is carried into a reactor building in step S13 shown in FIG. 1.
Figure 12:
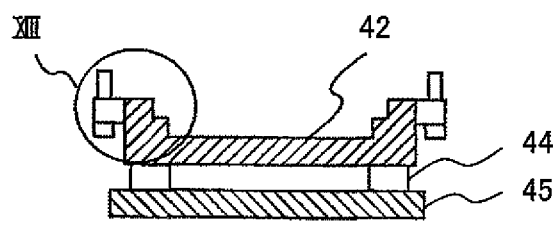
FIG. 12 is an enlarged longitudinal sectional view showing a cask bottom lid shown in FIG. 11.
Figure 13:
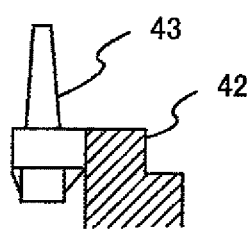
FIG. 13 is an enlarged view showing a XIII portion shown in FIG. 12.
Figure 14:
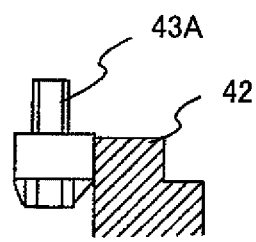
FIG. 14 is a structural diagram showing a XIII portion, which was shown in FIG. 12, of a cask bottom lid in another example.

A cask bottom lid is carried into the equipment pool (step S13). A bottom lid (a bottom portion of the radiation shield) 42 of a cask hoisted by the crane 18 is carried into the reactor building 25 through the opening portion 34 and placed outside the separation wall 78 in the equipment pool 29 (see FIG. 11). The bottom lid 42 is made up of a radiation shield. A structure of the bottom lid 42 is described using FIGS. 12 and 13. The bottom lid 42 has jacks 44 and a jack supporting member 45. The center portion of the bottom lid 42 caves in. The jacks 44, each upper end of which is fixed to the bottom lid 42, are provided to the jack supporting member 45. The jacks 44 are attached to the under surface of the bottom lid 42. A plurality of guiding pins 43, whose form is thinner toward the upper end, are fixed to the side walls of the bottom lid 42. Instead of the guiding pins 43, bolts 43A may be attached to the side walls of the bottom lid 42 in the direction that the screw portion of each bolt faces upward (see FIG. 14). The bottom lid 42 is carried into the equipment pool 29 during the time period before the step S14 to be described later is started and after the radiation shield 36 carried into the equipment pool 29 in the step S10 is started to be transferred toward the reactor well 28 while being hoisted by the ceiling crane 33. Preferably, the bottom lid 42 is carried into the equipment pool 29 during the period between the time when the radiation shield 36 is started to be transferred toward the reactor well 28 by the ceiling crane 33 in the step 10 and the time when the operation of the step S12 is completed. This allows the operation of the step S14 to be started immediately after the operation of Step S12 is completed. Therefore, the time required for carrying out the core shroud 4 can be reduced.

Figure 15:
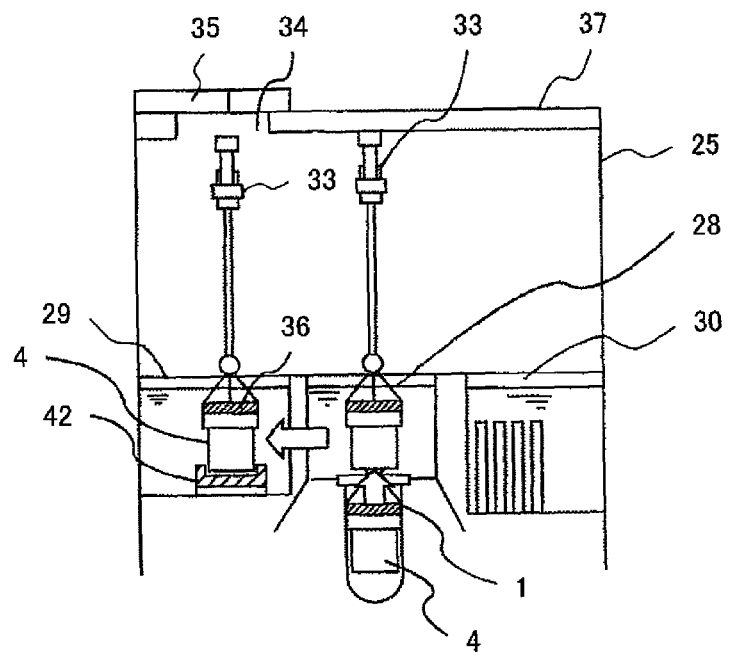
FIG. 15 is an explanatory drawing showing a state of carrying a core shroud into an equipment pool in step S14 shown in FIG. 1.

The core shroud is transferred to the equipment pool (step S14). As shown in FIG. 15, the core shroud 4 cut at the above-described position is lifted by the ceiling crane 33 and transferred from the RPV 1 into the reactor well 28. Then, the core shroud 4 is transferred into the equipment pool 29 by the ceiling crane 33 and put on top of the bottom lid 42 placed on the bottom of the equipment pool 29.

Figure 16:
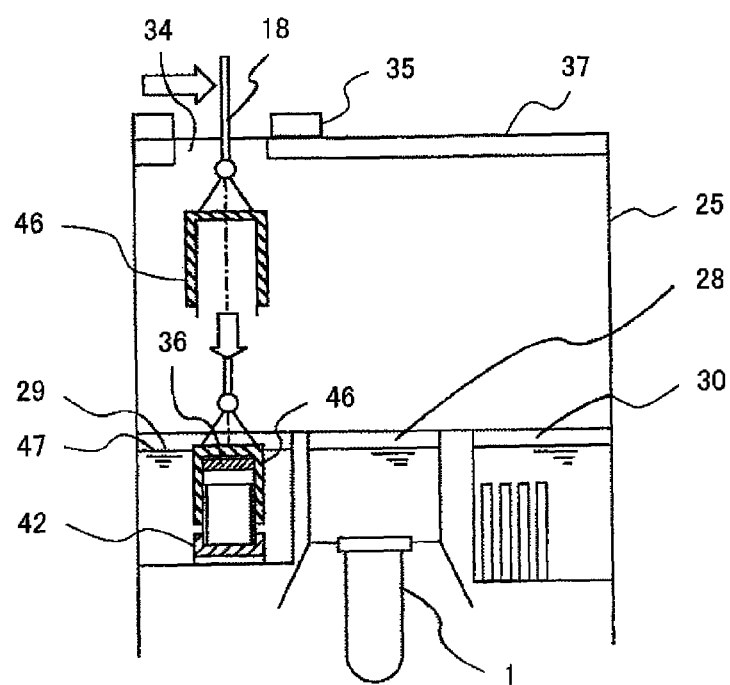
FIG. 16 is an explanatory drawing showing a state of carrying a cask shell into an equipment pool in step S15 shown in FIG. 1.
Figure 17:
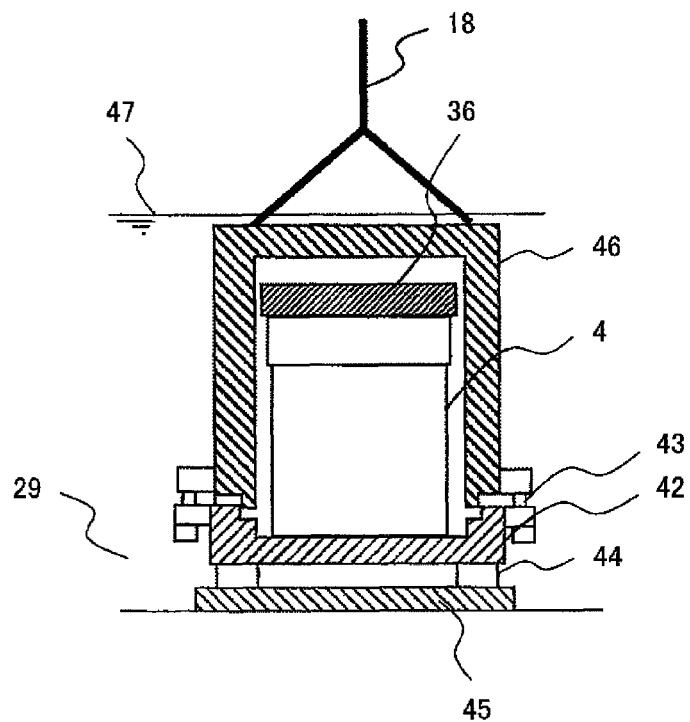
FIG. 17 is an explanatory drawing showing a core shroud covered with a cask shell in step S15.

A cask shell is carried into the equipment pool (step S15). A cask shell (the shell portion of the radiation shield) 46 hoisted by the crane 18 is, as shown in FIG. 16, carried into the reactor building 25 through the opening portion 34 and lowered into the equipment pool 29. The annular cask shell 46 is a radiation shield, and its upper end portion is closed while its lower end portion is open. The cask shell 46 is lowered in such a way that it covers the core shroud 4 placed on top of the bottom lid 42. The cask shell 46 is stopped from being lowered just before its bottom end contacts the top end of the bottom lid 42 and is kept being hoisted by the crane 18 with wires (see FIG. 17). A water surface 47 of the cooling water inside the equipment pool 29 is maintained at the upper end portion of the equipment pool 29.

Figure 18:
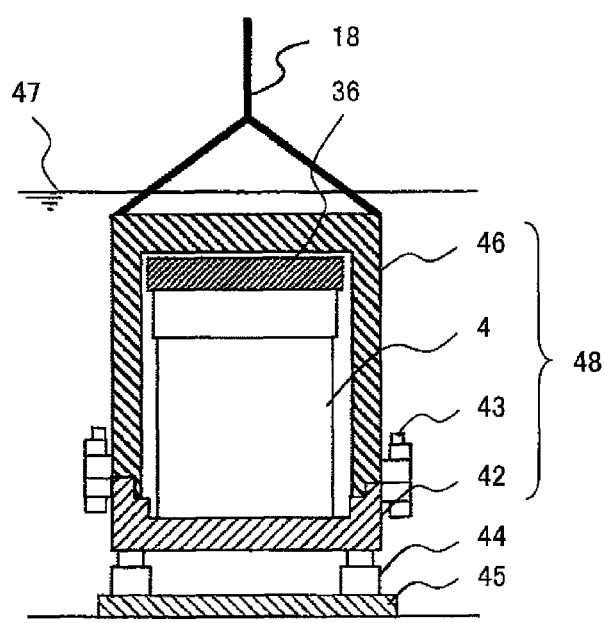
FIG. 18 is an explanatory drawing showing a state in which a bottom lid was joined to a cask shell.

The bottom lid is attached to the cask shell (step S16). After the cask shell 46 is stopped from being lowered, the bottom lid 42 is raised by operation of the jacks 44. When an upper end of the bottom lid 42 touches a lower end of the cask shell 46, the bottom lid 42 is stopped from being raised by the jacks 44. At this point, the guiding pins 43 are inserted into holes formed in a flange provided at the lower end portion of the cask shell 46. A nut is placed to an upper end portion of each guiding pin 43, and the bottom lid 42 is joined to the cask shell 46 by fastening each nut (see FIG. 18). The contacting portions of the bottom lid 42 and the cask shell 46 engage with each other to prevent radiation leakage from inside. A cask 48, which is a radiation shield surrounding the core shroud 4, is made up by attaching the bottom lid 42 to the cask shell 46 in this way.

Figure 19:
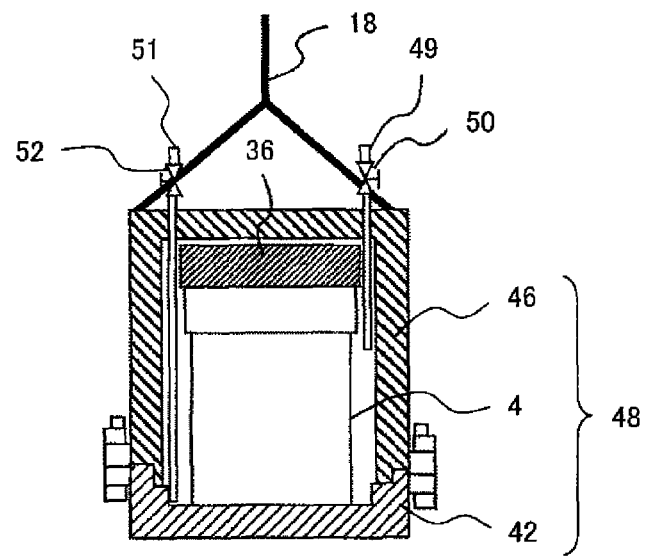
FIG. 19 is an explanatory drawing showing a water draining operation in step S17 shown in FIG. 1.

Water is drained from the cask (Step S17). A gas supplying pipe 51 provided with a valve 52 is, as shown in FIG. 19, disposed between a side wall of the cask 48 and the core shroud 4. A lower end of the gas supplying pipe 51 extends to the bottom of the cask 48, that is, near a top surface of the bottom lid 42. A water drainage pipe 49 provided with a valve 50 is also disposed between a side wall of the cask 48 and the core shroud 4. A lower end of the water drainage pipe 49 is positioned higher than the lower end of the gas supplying pipe 51, and disposed in the upper portion of the cask 48. The crane 18 is operated to pull the cask 48 up so that the cask 48 is lifted above the water surface 47. While the cask 48 hoisted by the crane 18 is held above the water surface 47, the valves 50 and 52 are opened. Nitrogen gas (or rare gas) is supplied from the gas supplying pipe 51 into the cask 48. The water in the cask 48 is discharged from the water drainage pipe 49 to the outside of the cask 48 due to the supply of this nitrogen gas. After the water is drained from the cask 48, the valves 50 and 52 are closed.

Figure 20:
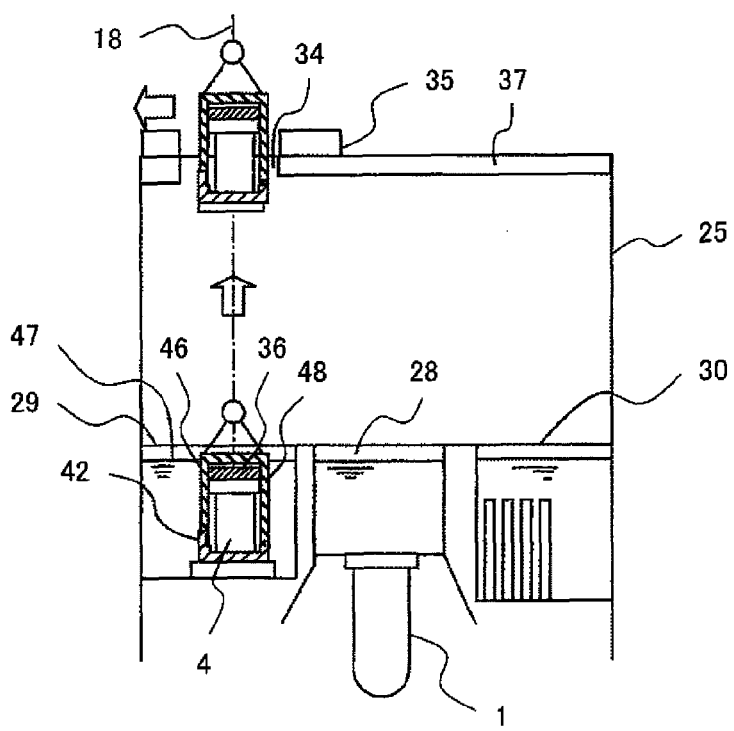
FIG. 20 is an explanatory drawing showing a state in which a core shroud is carried out of a reactor building in step S18 shown in FIG. 1.

The core shroud is carried out (Step S18). After the water is drained, the cask 48 is lifted by the crane 18, and the core shroud 4 shielded by the cask 48 is carried out of the reactor building 25 through the opening portion 34 (see FIG. 20). The jacks 44 and the jack supporting member 45 are also carried out with the cask 48. After the cask 48 is carried out, the shutter 35 is closed, closing the opening portion 34. The cask 48 including the core shroud 4 is carried out of the reactor building 25 by the crane 18, and stored in a storage provided in the nuclear power plant (step S19).

The whole operation of carrying out the core shroud 4 in the RPV 1 out of the reactor building 25 is completed by the above operations.

In the present embodiment, since the core shroud 4 covered by the radiation shield (the cask 48) is carried out of the reactor building 25 through the opening portion 34 formed in the ceiling 37 of the reactor building 25 at the position directly above the equipment pool 29, it can prevent the core shroud 4 from tipping and falling into the fuel storage pool 30 storing the fuel assemblies 10 during the carrying out. For this reason, the fuel assemblies 10 in the fuel storage pool 30 will not be damaged in the present embodiment, and safety during the carrying out of the core shroud 4 is significantly improved. When the cut core shroud 4 is transferred from the RPV 1 to the equipment pool 29, the core shroud 4 is transferred only through the reactor well 28 and does not transferred above the operation floor 27. This ensures that the core shroud 4 does not fall into the fuel storage pool 30.

Since the cut core shroud 4 does not fall into the fuel storage pool 30 during the transfer, the core shroud 4 can be transferred while the fuel assemblies 10 are stored in the fuel storage pool 30. This eliminates the need of transferring the fuel assemblies 10 in the fuel storage pool 30 to a fuel storage pool in another BWR plant when the core shroud 4 is to be transferred. This contributes to a significant reduction in the time period required for completing the carry operation of the core shroud 4. Furthermore, since the present embodiment requires no protection device 59 for preventing the carrying out core shroud 4 from falling into the fuel storage pool 30, as in fourth embodiment described later, the time period required for completing the carry operation of the core shroud 4 can be further reduced.

Since the radiation shield 36 is installed onto the upper end portion of the core shroud 4 in the RPV 1, radiation from the core shroud 4 can be shielded by the radiation shield 36. When the core shroud 4 is pulled up into the reactor well 28, the upper end of the core shroud 4 comes close to the water surface in the reactor well 28. However, since the radiation shield 36 is installed on the upper end of the core shroud 4, the radiation released above the water surface can be greatly reduced. After the core shroud 4 is transferred into the equipment pool 29, the radiation from the core shroud 4 reaching above the water surface in the equipment pool 29 can also be significantly reduced by the radiation shield 36. The radiation shield 36 is provided with the hoist members (the hoist bolts 41) so that, by attaching the radiation shield 36 to the core shroud 4, the cut core shroud 4 can be easily lifted by the ceiling crane 33.

The cut core shroud 4 can be transferred from the RPV 1 to the equipment pool 29 using the ceiling crane 33 because the cask 48, which is a very heavy radiation shield, is attached to the core shroud 4 in the equipment pool 29.

In the present embodiment, the bottom lid 42 of the cask 48 is attached to the cask shell 46 after the core shroud 4 and the bottom lid 42 are raised by operation of the jacks 44. This allows the bottom lid 42 to contact the cask shell 46 easily and quickly. In addition, since the bottom lid 42 is raised by the jacks 44 while the cask shell 46 is hoisted by the crane 18, the bottom lid 42 can be attached to the cask shell 46 without the weight of the cask shell 46 pressed on the bottom of the equipment pool 29. If the cask shell 46 is put on the bottom lid 42 placed on the bottom of the equipment pool 29, all the weight of the core shroud 4, the bottom lid 42, and the cask shell 46 concentrates on one part of the bottom of the equipment pool 29 supporting the bottom lid 42. When these loads concentrate on one part of the bottom of the equipment pool 29, the bottom of the equipment pool 29 may not be able to support the weight unless reinforcement work is done to it. The present embodiment has no such concern since the weight of the cask shell 46 is not on the bottom of the equipment pool 29.

In the present embodiment, the top head 3 of the RPV 1, and the stream dryer 17, the steam separator 16, and the shroud head 21 taken out from the RPV 1 are disposed on top of the other at one corner in the equipment pool 29 so that a space to put the core shroud 4 is ensured in the equipment pool 29. Therefore, the bottom lid 42 and the cask shell 46 can be attached to the core shroud 4 in the equipment pool 29.

In the present embodiment, since the cask 48 which is a radiation shield, is attached to the core shroud 4 in the equipment pool 29, a long opening portion 54 is not required to be formed in the ceiling 37 as in second embodiment. This reduces the time required for forming the opening portion in the ceiling. Furthermore, no shutter 55 is needed.

Reactor internal equipments and piping stored in the core shroud 4 can be carried out of the reactor building 25 with the core shroud 4. This reduces the time required for carrying out the removed reactor internal equipments and cut piping. If the reactor internal equipments and piping are carried out of the reactor building 25 separately from the core shroud 4, it takes longer to complete the carry operation of the core shroud 4, reactor internal equipments, and piping. However, the present embodiment can reduce such time.

Since the cut core shroud 4 is surrounded by the cask 48, when the core shroud 4 is carried out of the reactor building 25, radiation from the core shroud 4 to a worker can be prevented.

After the cut core shroud 4 is carried out of the reactor building 25, a newly manufactured core shroud 4 is carried into the reactor building 25 through the opening portion 34 by the crane 18 and transferred into the equipment pool 29. This new core shroud 4 is hoisted by the ceiling crane 33, transferred to the reactor well 28, and lowered to the predetermined position in the RPV 1. This new core shroud 4 is joined to the shroud support cylinder 5 by welding. Jet pumps are installed in the RPV 1, and the fuel assemblies 10 in the fuel storage pool 30 are loaded in the core. The steam separator 16 and the steam dryer 17 placed in the equipment pool 29 are installed in the RPV 1, and the top head 3 is attached to the RPV 1. After that, operation of the BWR plant is started.

Figure 21:
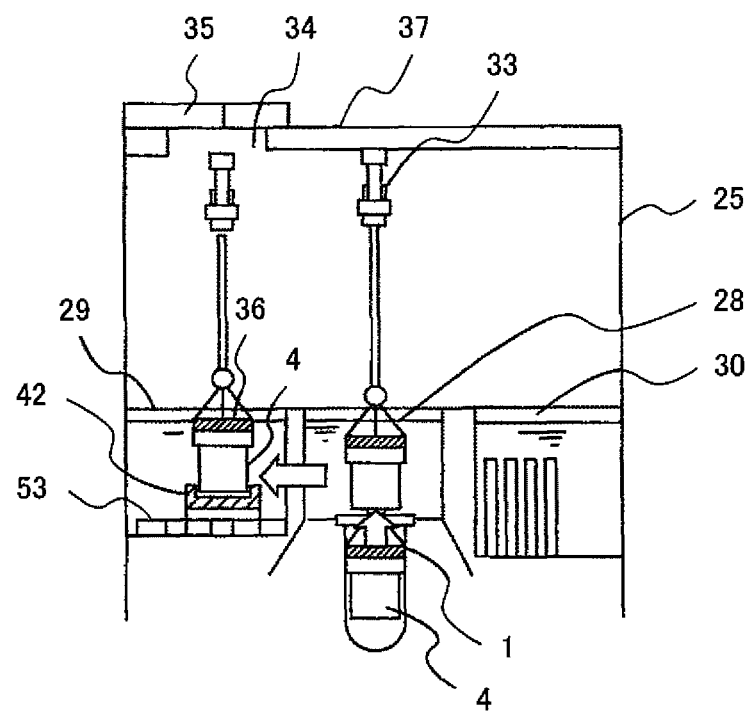
FIG. 21 is an explanatory drawing showing another example in which a core shroud is carried into an equipment pool in step S14 shown in FIG. 1.
Figure 22:
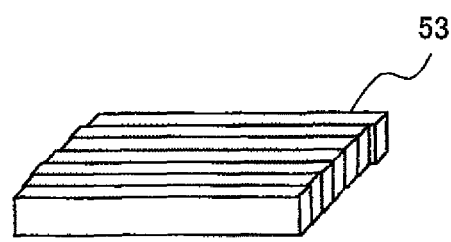
FIG. 22 is an enlarged perspective view showing load dispersion members shown in FIG. 21.

If the cask shell 46 is to be put on the bottom lid 42 placed on the bottom of the equipment pool 29 in the step S15 of the present embodiment, load dispersion members 53 are spread over a wide range of the bottom of the equipment pool 29 in the step S13. Then, the bottom lid 42 carried into the reactor building 25 is put on the load dispersion members 53 (see FIG. 21). The load dispersion members are made up of a plurality of rectangular blocks as shown in FIG. 22. The load dispersion members 53 are placed across a plurality of beams making up the bottom portion of the equipment pool 29 and work to disperse the load of the core shroud 4 and the cask shell 46 over a wide range of the bottom of the equipment pool 29. In the step S15, the core shroud 4 taken out from the RPV 1 is put on the bottom lid 42 placed on the bottom of the equipment pool 29. Then, in the step S16, the cask shell 46 carried into the reactor building 25 is lowered by the crane 18 and put on the bottom lid 42. After that, the bottom lid 42 and the cask shell 46 are joined as described above. When the load dispersion members 53 are used, neither the jacks 44 nor the jack supporting member 45 is needed. Since the load of the core shroud 4, the bottom lid 42, and the cask shell 46 can be dispersed over a wide range of the bottom of the equipment pool 29 by the load dispersion members 53, no reinforcement work is necessary to the bottom of the equipment pool 29.

Second Embodiment

Figure 23:
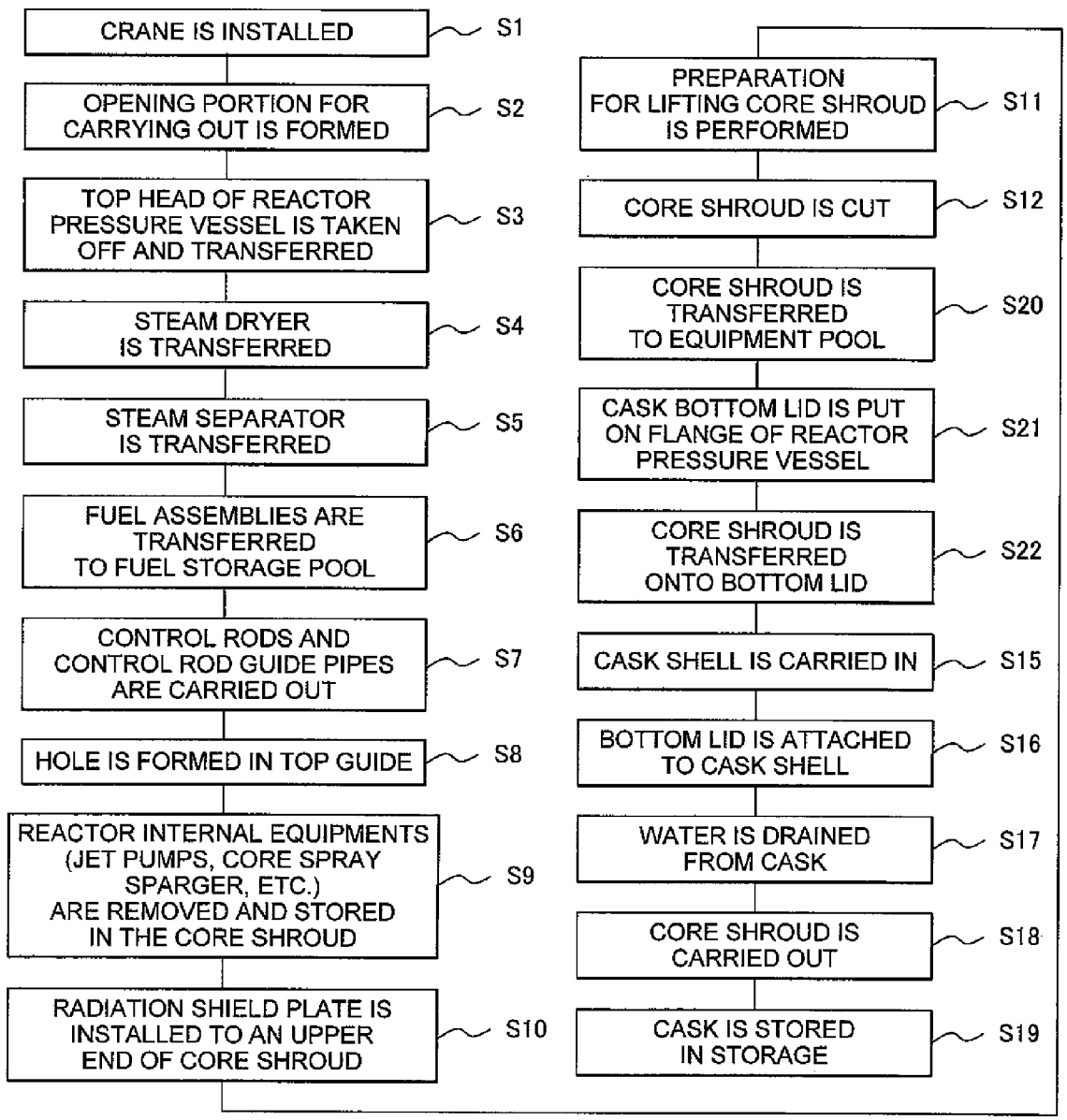
FIG. 23 is a flowchart showing operation procedures of a method for carrying out a reactor internal according to second embodiment which is another embodiment of the present invention.

A method for carrying out a reactor internal according to second embodiment, which is another embodiment of the present invention, will now be described below with reference to FIG. 23. The present embodiment provides a method for carrying out a reactor internal applicable to a BWR plant, in which method, a core shroud is an object carried out. In the present embodiment, the operations of the steps S13 and S14 in the steps S to S19 executed in the first embodiment, are replaced by those of steps S20 to S22. Each operation of the steps S1 to S12 and S15 to S19 executed in the present embodiment is practically the same as that in the first embodiment. Each operation of the steps S20 to S22, which is different from the first embodiment, will be described.

Figure 24:
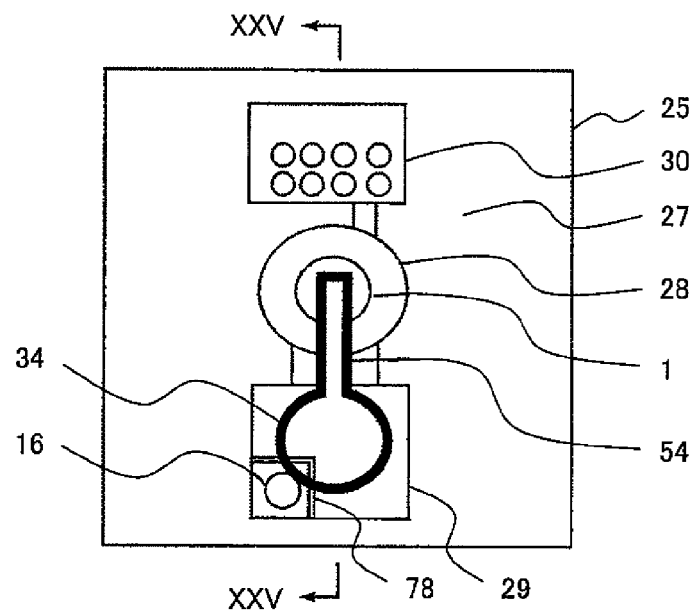
FIG. 24 is an explanatory drawing showing an opening portion formed in a ceiling of a reactor building in step S2 shown in FIG. 23.
Figure 25:
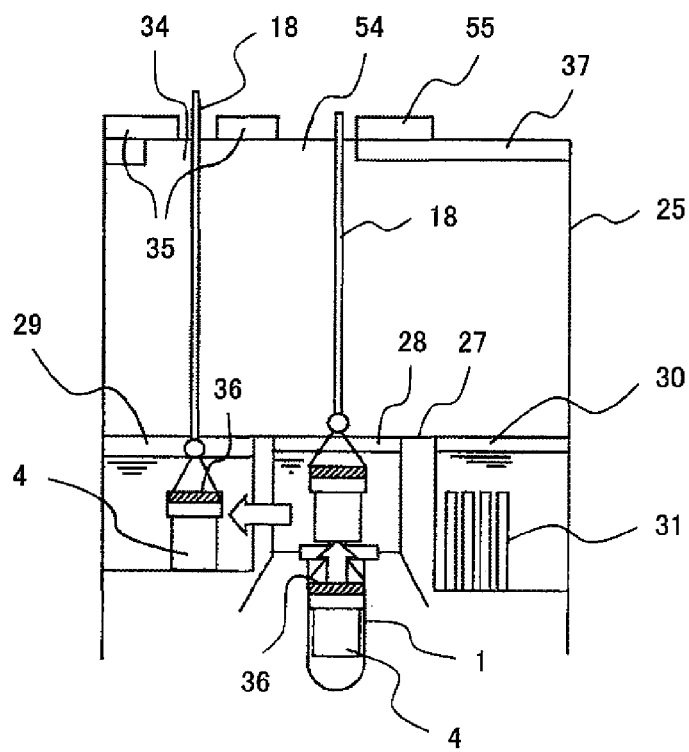
FIG. 25 is an explanatory drawing showing a state of carrying a core shroud into an equipment pool in step S20 shown in FIG. 23 in cross-section taken along a line XXV-XXV of FIG. 24.

In order to execute the carry method of the present embodiment, a long opening portion 54 other than the opening portion 34, extending from the opening portion 34 to the position directly above the reactor well 28, is formed in the ceiling 37 of the reactor building 25 in the step S2 (see FIG. 24). The opening portion 54 has a narrow width through which only wires hanging from the crane 18 can pass. The opening portion 54 can be closed by a shutter 55 (see FIG. 25). Since the opening portion 54 is formed in the present embodiment, the core shroud 4, the steam dryer 17, the stream separator 16, the bottom lid 46, and the cask shell 46, which are transferred within the reactor building 25 using the ceiling crane 33 in the first embodiment, can be carried using the crane 18. After each operation of the steps S1 to S12 is executed, the operation of the step S20 is performed. However, in the step S10 in the present embodiment, the radiation shield 36 carried into the reactor building 25 through the opening portion 34 hoisted by the crane 18 is transferred to the position directly above the RPV 1 in the reactor well 28 by the crane 18. At this point, the wires hanging the radiation shield 36 run through the opening portion 54. Then, the radiation shield 36 is lowered to the upper end portion of the core shroud 4 by operation of the crane 18 and attached to the upper end portion of the core shroud 4.

Figure 26:
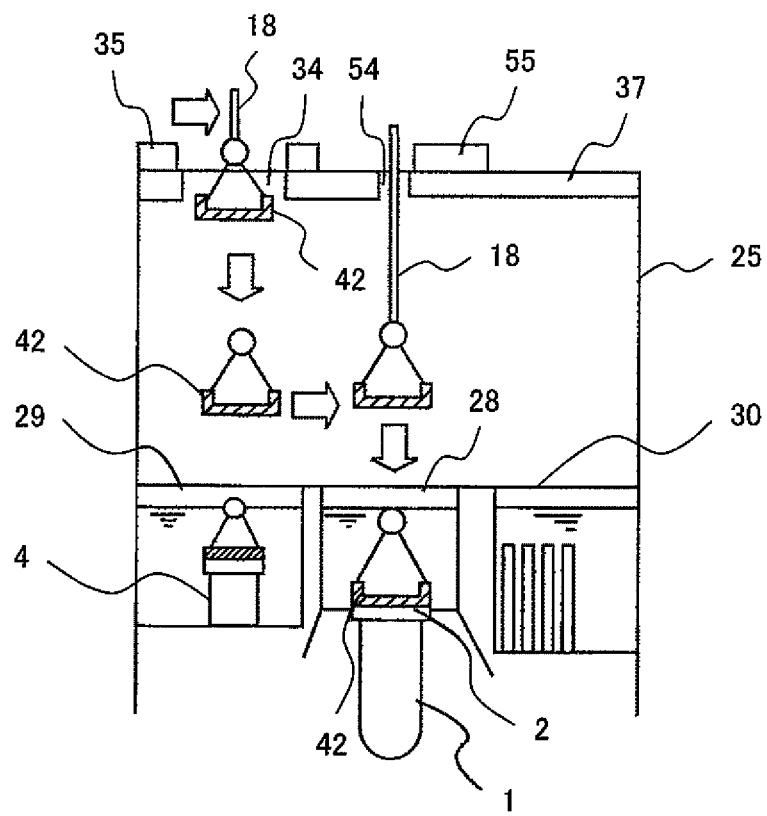
FIG. 26 is an explanatory drawing showing a state of carrying a cask bottom lid in step S21 shown in FIG. 23.
Figure 27:
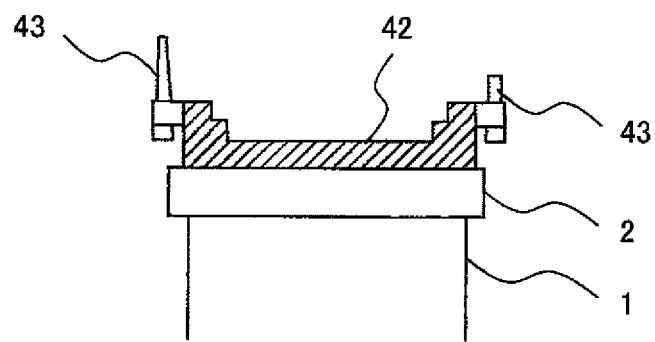
FIG. 27 is an explanatory drawing showing a cask bottom lid, carried in step S21, disposed on a reactor vessel.

The core shroud is transferred into the equipment pool (step S20). The cut core shroud 4 is lifted by the crane 18, carried from the RPV 1 into the equipment pool 29, and put on the bottom of the equipment pool 29 (see FIG. 25). The cask bottom lid is carried into the reactor building and transferred onto the RPV (step S21). The bottom lid 42 hoisted by the crane 18 is carried into the reactor building 25 through the opening portion 34, and transferred in the horizontal direction above the operation floor 27 by operation of the crane 18. Then, this bottom lid 42 is carried to the position directly above the reactor well 28. Further, the bottom lid 42 is lowered by the crane 18 and directly put on the flange 2 of the RPV 1 (see FIG. 26). The bottom lid 42 used in the present embodiment is provided with neither the jacks 44 nor the jack supporting member 45. FIG. 27 shows a state in which the bottom lid 42 is placed on the flange 2. The ceiling crane 33 may be used for carrying the cut core shroud 4 into the equipment pool 29 and for carrying the bottom lid 42 within the reactor building 25.

Figure 28:
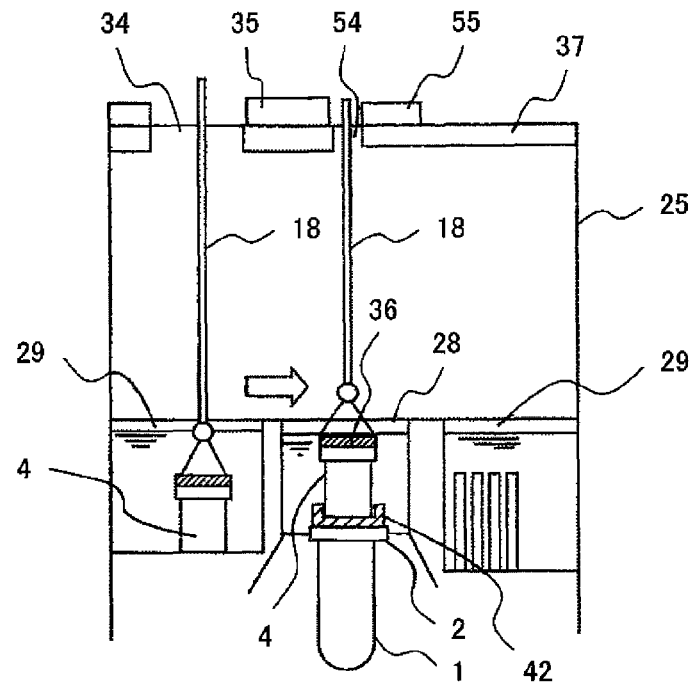
FIG. 28 is an explanatory drawing showing a state of carrying a core shroud from an equipment pool onto a reactor pressure vessel in step S22 shown in FIG. 23.

The core shroud is transferred onto the bottom lid (step S22). The core shroud 4 in the equipment pool 29 is hoisted by the crane 18, transferred into the reactor well 28, and then, lowered in the reactor well 28. This core shroud 4 is put on the bottom lid 42 placed on the flange 2 (see FIG. 28).

Figure 29:
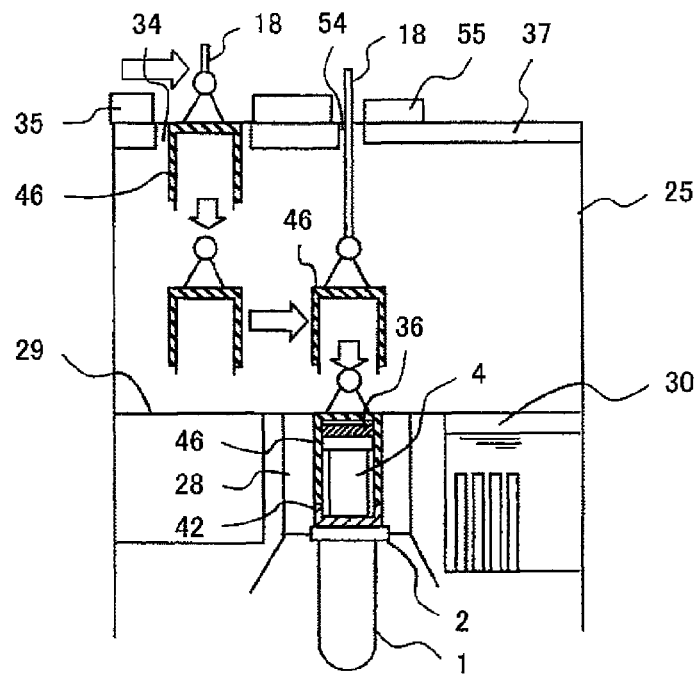
FIG. 29 is an explanatory drawing showing a state of carrying a cask shell in step S15 shown in FIG. 23.
Figure 30:
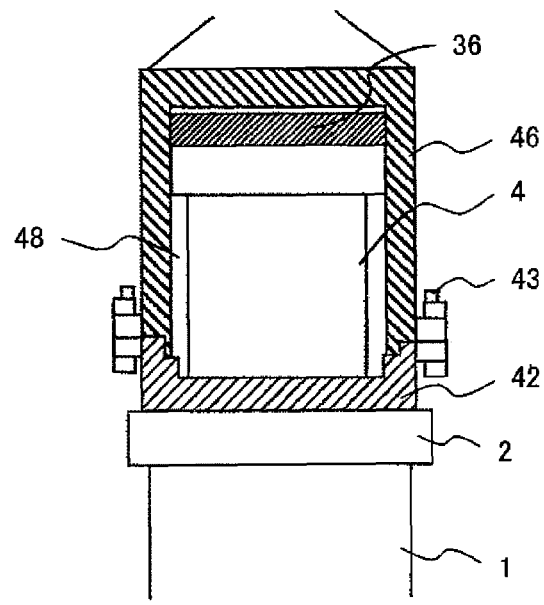
FIG. 30 is an explanatory drawing showing a state in which a bottom lid and a cask shell are surround a core shroud disposed on a reactor pressure vessel, and the bottom lid and the cask shell are joined in step S16 shown in FIG. 23.

In the carry operation of the step S15 in the present embodiment, the cask shell 46 is transferred into the reactor well 28 by the crane 18. The cask shell 46 hoisted by the crane 18 is carried into the reactor building 25 through the opening portion 34, and transferred in the horizontal direction above the operation floor 27 to the position directly above the reactor well 28 (see FIG. 29). This cask shell 46 is lowered into the reactor well 28 by operation of the crane 18 almost to the core shroud 4 placed on the bottom lid 42 put on the flange 2. The cask shell 46 is further lowered in such a way that it covers the core shroud 4, and when the bottom end of the cask shell 46 contacts the upper end of the bottom lid 42, the cask shell 46 is stopped from being lowered (see FIG. 29). In the step S16 of the present embodiment, the bottom lid 42 is attached to the cask shell 46 while the bottom lid 42 is put on the flange 2 of the RPV 1 (see FIG. 30). In this way, the cask 48 is attached to the core shroud 4.

Figure 31:
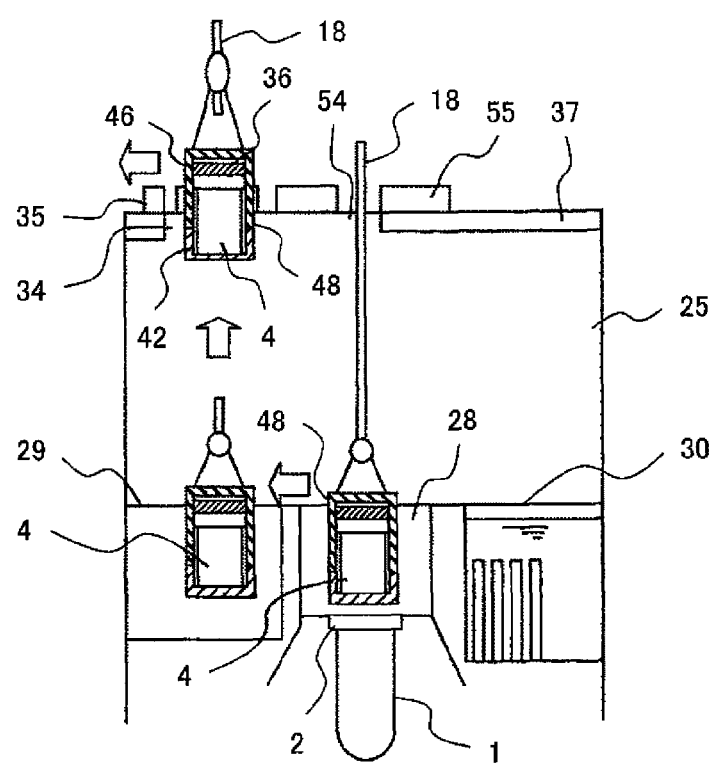
FIG. 31 is an explanatory drawing showing a state of carrying out a core shroud in step S18 shown in FIG. 23.

Water is drained from the cask 48 in the step S17 while the cask 48 is hoisted by the crane 18. Then, the core shroud 4 surrounded by the cask 48, storing reactor internal equipments and piping inside, is hoisted by the crane 18 with wires attached to the cask 48 and carried from the reactor well 28 into the equipment pool 29 (see FIG. 31). The cask 48 storing the core shroud 4 is lifted by the crane 18 and carried out of the reactor building 25 through the opening portion 34.

In the present embodiment, each effect produced in the first embodiment can be obtained except for the one produced by that the bottom lid 42 raised by the jacks 44 is attached to the cask shell 46 while the cask shell 46 is hoisted by the crane 18. In the present embodiment, since the opening portion 54 is formed in the ceiling 37 of the reactor building 25, which opening portion extends from the opening portion 34 formed directly above the equipment pool 29 to the position directly above the reactor well 28, there is no need to switch between the crane 18 and the ceiling crane 33 for hoisting carrying objects (for example, the core shroud 4 and the radiation shield 36) as in the first embodiment. This can reduce the time required for carrying these objects.

In the present embodiment, the bottom lid 42 and the cask shell 46 are joined while the bottom lid 42 is put on the flange 2 of the RPV 1, the cut core shroud 4 is put on the bottom lid 42, and in addition, the cask shell 46 is put on the bottom lid 42. In the present embodiment such as this, all the weight of the core shroud 4, the bottom lid 42 and the cask shell 46 put on the bottom lid 42 are supported by the RPV 1. Since the RPV 1 is installed on a pedestal (not shown) set up on a base mat, it can sufficiently support all the weight of the core shroud 4, the bottom lid 42, and the cask shell 46. This eliminates the need of setting up a new support member for supporting the cask 48 which is a radiation shield. Thus, the time required for carrying out the cut core shroud 4 can be reduced.

Third Embodiment

Figure 32:
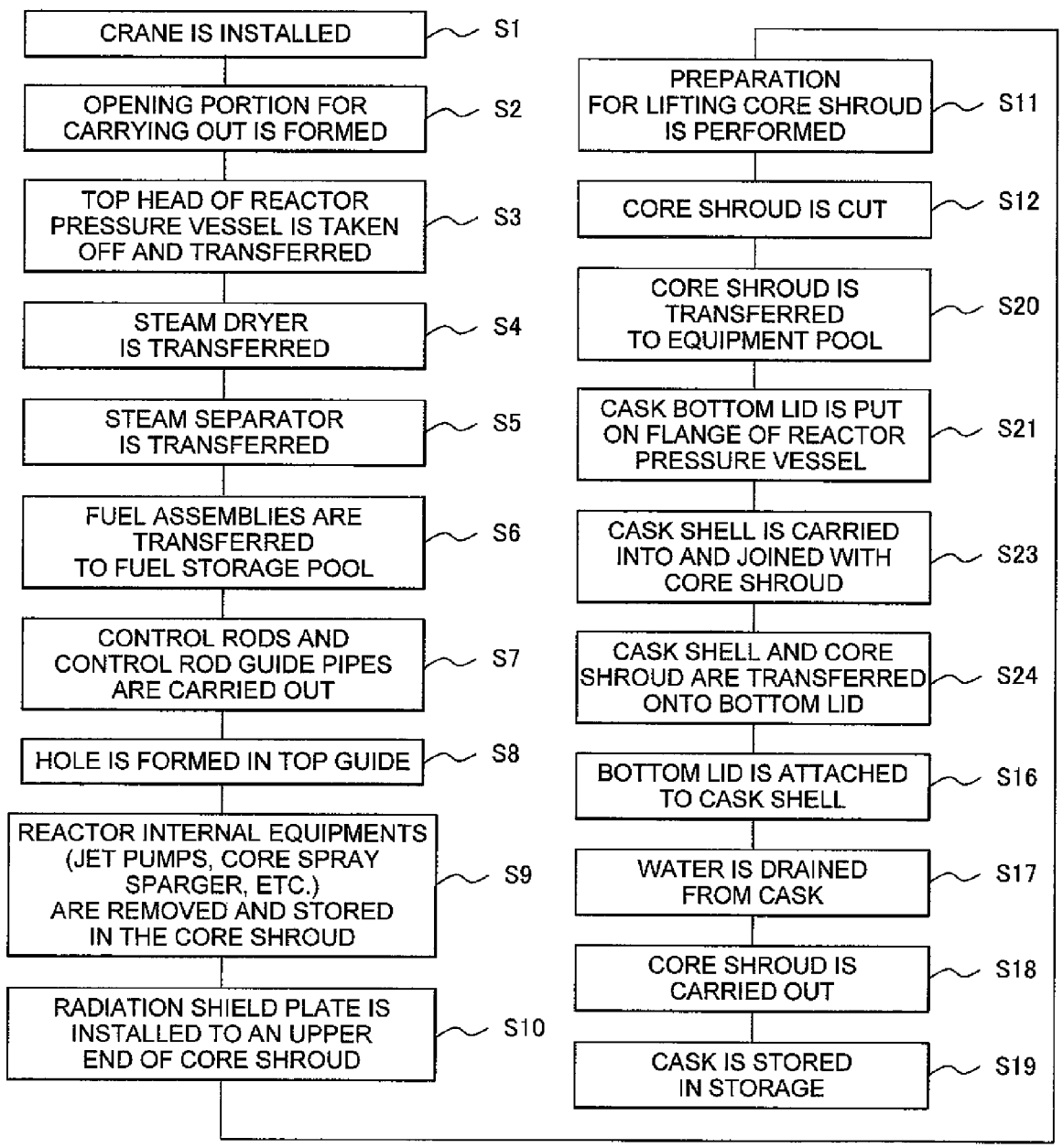
FIG. 32 is a flowchart showing operation procedures of a method for carrying out a reactor internal according to third embodiment which is another embodiment of the present invention.

A method for carrying out a reactor internal according to third embodiment, which is another embodiment of the present invention, will now be described below with reference to FIG. 32. The present embodiment also provides a method for carrying out a reactor internal applicable to a BWR plant, in which method, a core shroud is an object carried out. In the present embodiment, the operations of the steps S13 to S15 in the steps S1 to S19 executed in the first embodiment, are replaced by those of steps S20, S21, S23, and S24. Each operation of the steps S1 to S12 and S16 to S19 executed in the present embodiment is practically the same as that in the first embodiment. The operations of the steps S21, S23, and S24, which are different from the first embodiment, will be described. The operation of the step S20 is the same as that in the second embodiment.

Figure 33:
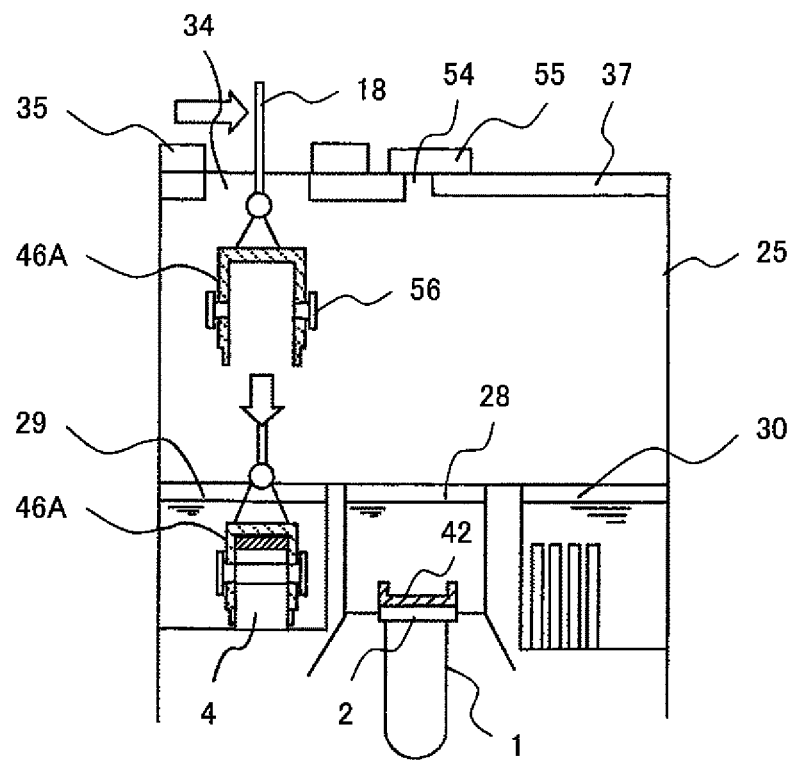
FIG. 33 is an explanatory drawing showing a state of carrying a cask shell into a reactor building, and fixing the cask shell to a core shroud in step S23 shown in FIG. 32.
Figure 34:
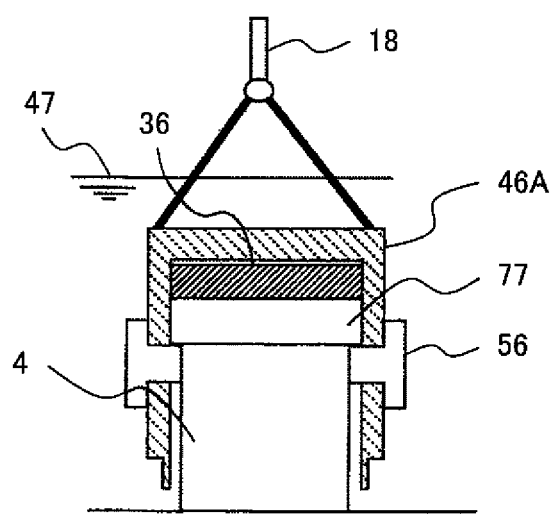
FIG. 34 is a detailed explanatory drawing showing a cask shell fixed to a core shroud.

In the present embodiment, the opening portion 54, other than the opening portion 34, is formed on the ceiling 37 of the reactor building 25 in the step S2 in the same manner as in the second embodiment. After each operation of the steps S3 to S12 and S20 are executed, the cask bottom lid is carried into and transferred onto the RPV (step S21). The operation of this the step S21 is the same as that of the step S21 in the second embodiment. Then, the cask shell is carried into the reactor building to be joined with the core shroud (step S23). A cask shell 46A hoisted by the crane 18 is carried into the reactor building 25 through the opening portion 34. This cask shell 46A is lowered and covers the core shroud 4 placed in the equipment pool 29 (see FIG. 33). The cask shell 46A is provided with a couple of joining members (for example, bolts or pins) 56 extending toward the axis of the cask shell 46A from positions opposing the side walls. Each joining member 56 engages with a side wall of the cask shell 46A with a screw, and is turned to be moved toward the core shroud 4. When the tips of both joining members 56 touch the outer surface of the core shroud 4 in the cask shell 46A, the joining members 56 are stopped from being turned. The tip portions of the two joining members 56, contacting the outer surface of the cask shell 46A, are located below an upper flange 77 of the core shroud 4 (see FIG. 34).

Figure 35:
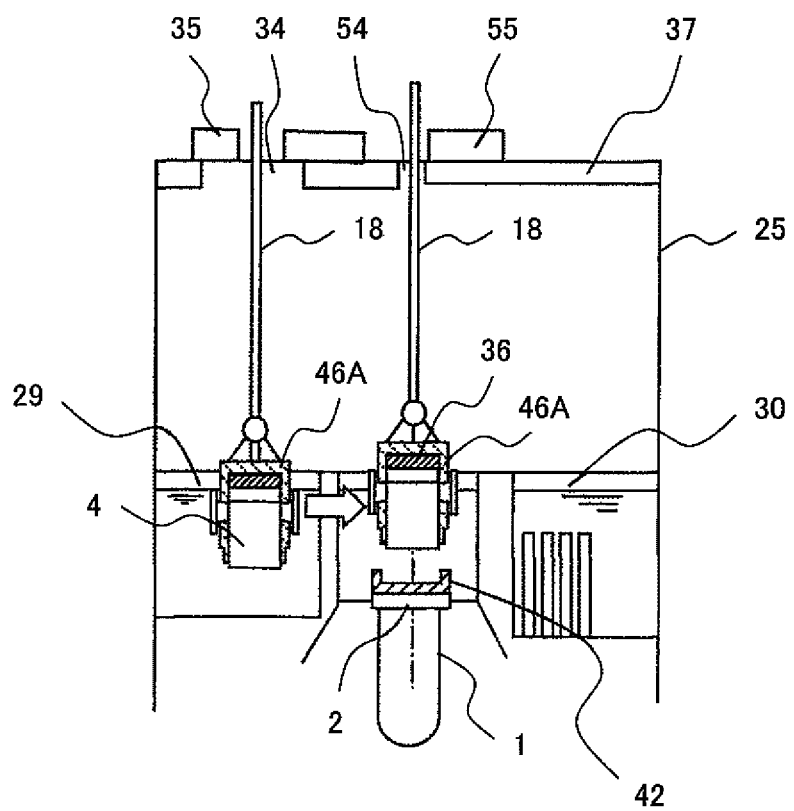
FIG. 35 is an explanatory drawing showing a state of carrying a cask shell and a core shroud in step S24 shown in FIG. 32.

The cask shell and the core shroud are transferred onto the bottom lid on the RPV (Step S24). The cask shell 46A in the equipment pool 29 is hoisted by the crane 18. The core shroud 4 in the cask shell 46A is supported by the two joining members 56 and lifted with the cask shell 46A. The cask shell 46A and the core shroud 4 are transferred from the equipment pool 29 into the reactor well 28 (see FIG. 35). The core shroud 4 is put on the bottom lid 42 placed on the flange 2 of the RPV 1. The bottom lid 42 is attached to the cask shell 46A in the same manner as in the second embodiment (step S16), and water is drained from the cask 48 (step S17). The core shroud 4 surrounded by the cask 48 is carried out of the reactor building 25 (step S18), and stored in the storage (step S19).

In the present embodiment, each effect produced in the second embodiment can be obtained. In the present embodiment, since the core shroud 4 and the cask shell 46A are carried from the equipment pool 29 onto the RPV 1 together, the time required for carrying the core shroud 4 and the cask shell 46A can be reduced compared to the second embodiment in which the cask shell 46, and the core shroud 4 placed in the equipment pool 29 are separately carried onto the RPV 1. For this reason, the present embodiment can reduce the time required for carrying the core shroud 4 out of the reactor building 25 compared to the second embodiment.

Fourth Embodiment

Figure 36:
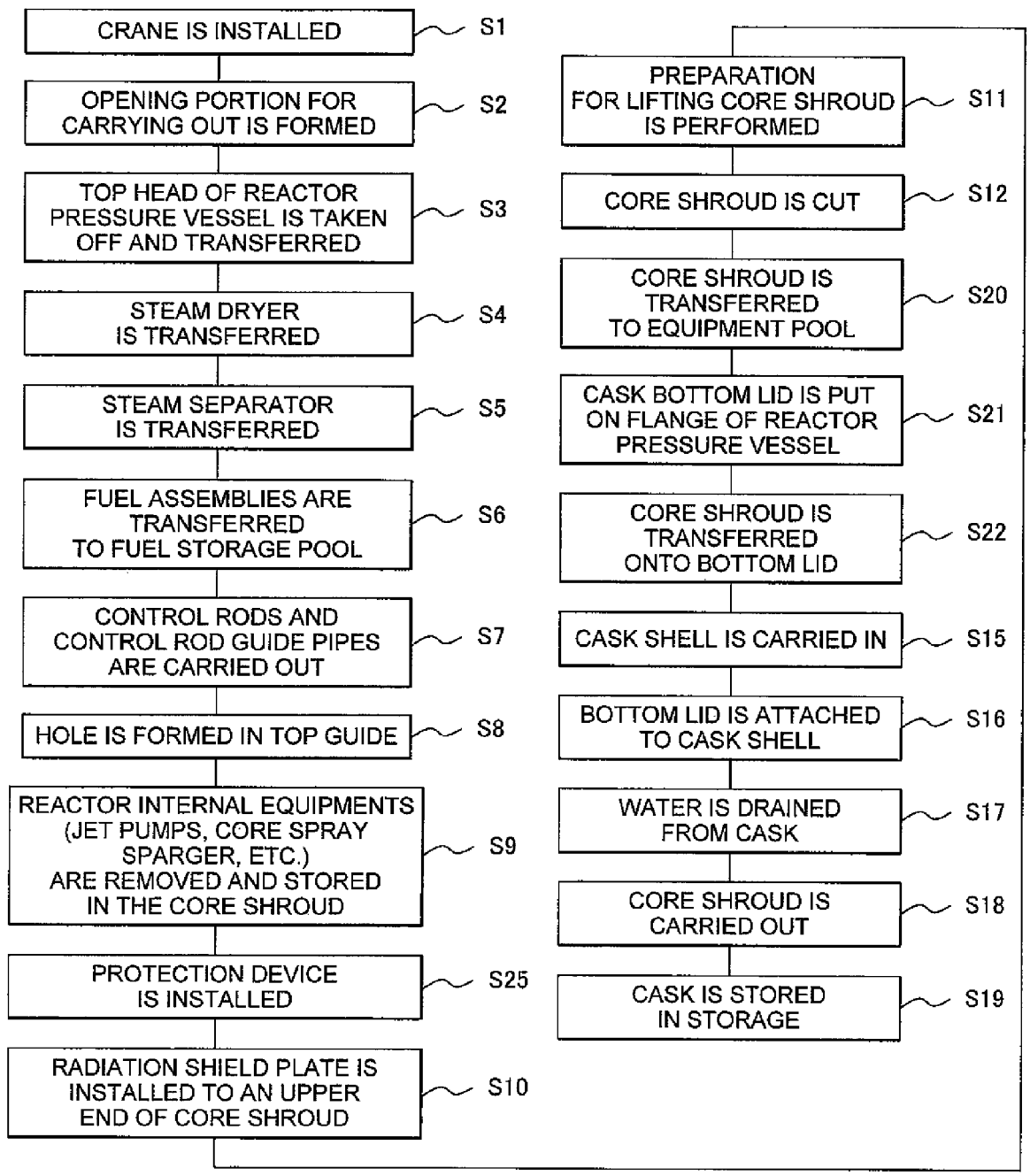
FIG. 36 is a flowchart showing operation procedures of a method for carrying out a reactor internal according to fourth embodiment which is another embodiment of the present invention.

A method for carrying out a reactor internal according to fourth embodiment, which is another embodiment of the present invention, will now be described below with reference to FIG. 36. The present embodiment also provides a method for carrying out a reactor internal applicable to a BWR plant, in which method, a core shroud is an object carried out. In the present embodiment, the operation of step S25 is added to the operations of the steps S1 to S12, S20 to S22, and S15 to S19 executed in the second embodiment. The step S25 is executed between the steps S9 and S10. In the present embodiment, each operation except for the operation of the step S25, which is an essentially different operation, is practically the same as that in the second embodiment.

Figure 37:
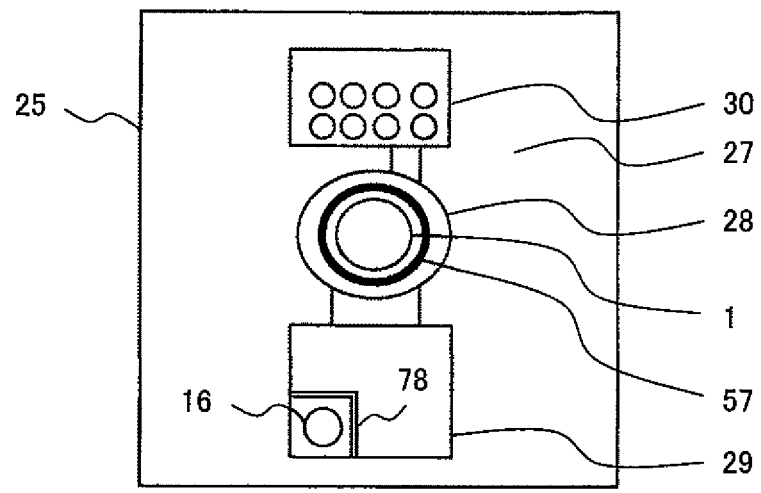
FIG. 37 is an explanatory drawing showing an opening portion formed in a ceiling of a reactor building in step S2 shown in FIG. 36.

After the installation of the crane 18 is completed in the step S1, an opening portion 57 is formed in the ceiling 37 of the reactor building 25 directly above the reactor well 28, that is, the RPV 1, as in FIG. 37 (step S2). A shutter 58 for opening and closing the opening portion 57 is installed to the ceiling 37. In the steps S3 to S5, the crane 18 is used to carry relevant equipment out of the reactor building 25 through the opening portion 57. After that, the operations of the steps S6 to S9 are executed.

Figure 38:
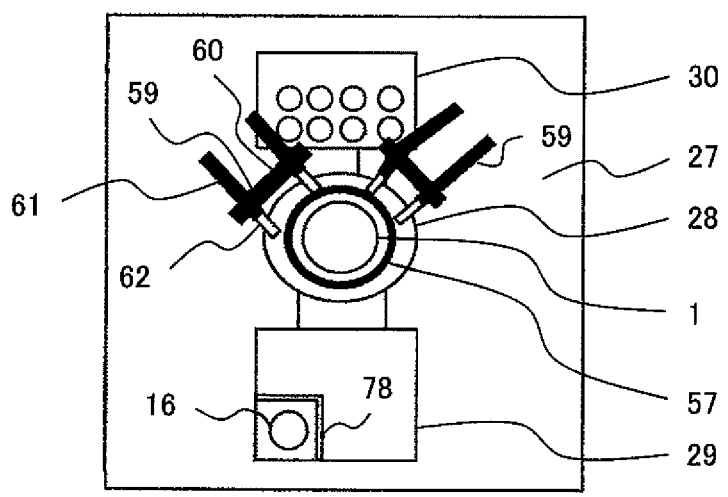
FIG. 38 is an explanatory drawing showing a placement of protection devices installed on an operation floor in step S25 shown in FIG. 36.
Figure 39:
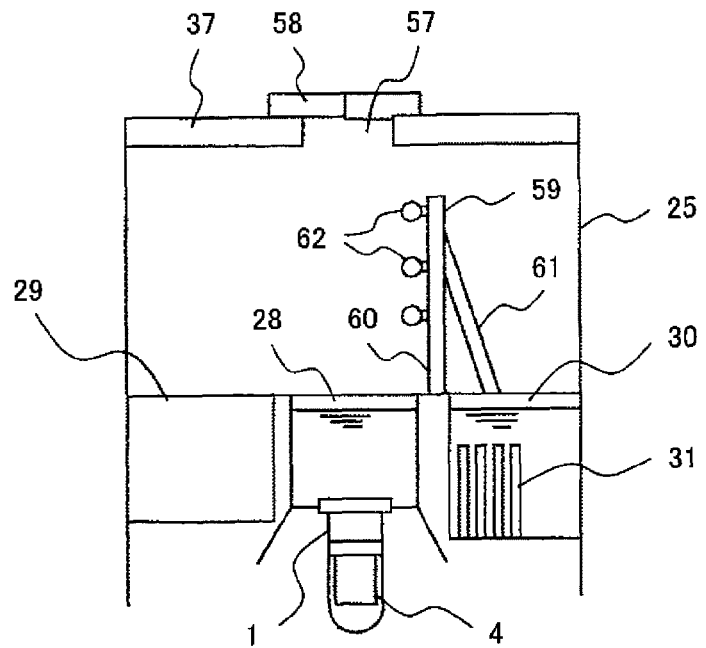
FIG. 39 is a longitudinal sectional view of a reactor building in which a protection device is installed.
Figure 40:
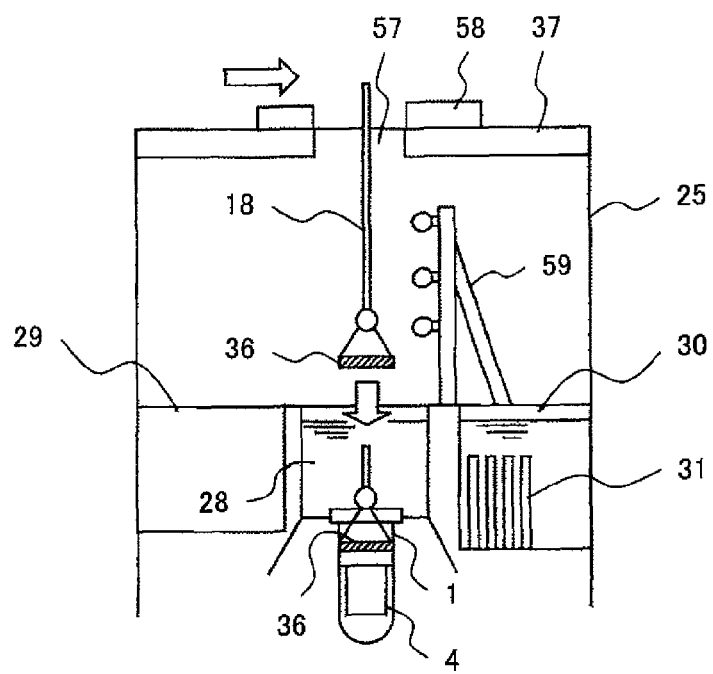
FIG. 40 is an explanatory drawing showing a state of carrying a radiation shield plate onto a core shroud in step S10 shown in FIG. 36.

A protection device is set up on the operation floor (step S25). A protection device 59, as shown in FIGS. 38 and 39, comprises a protection wall 60, support members 61, and a plurality of pulleys 62. A couple of support members 61 are attached to the protection wall 60 to prevent the protection wall from falling. The plurality of pulleys 62 are rotatably attached to the protection wall 60 along the height direction. Two protection devices 59 are set up on the operation floor 27 in such a way that each protection wall 60 faces the reactor well 28 (see FIG. 38). The radiation shield plate 36 hoisted by the crane 18 is carried into the reactor building 25 through the opening portion 57 as shown in FIG. 40, and attached to the upper end portion of the core shroud 4 in the RPV 1 (step S10).

Figure 41:
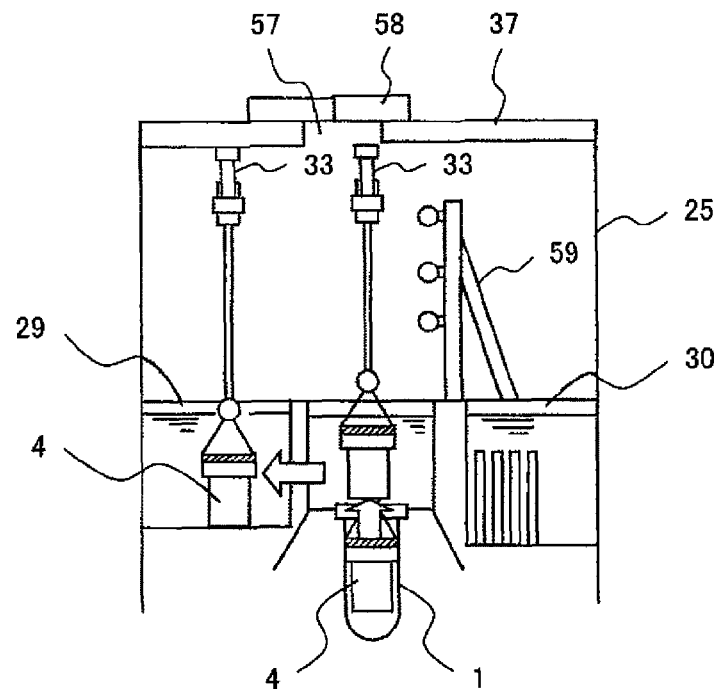
FIG. 41 is an explanatory drawing showing a state of carrying a core shroud into an equipment pool in step S20 shown in FIG. 36.
Figure 42:
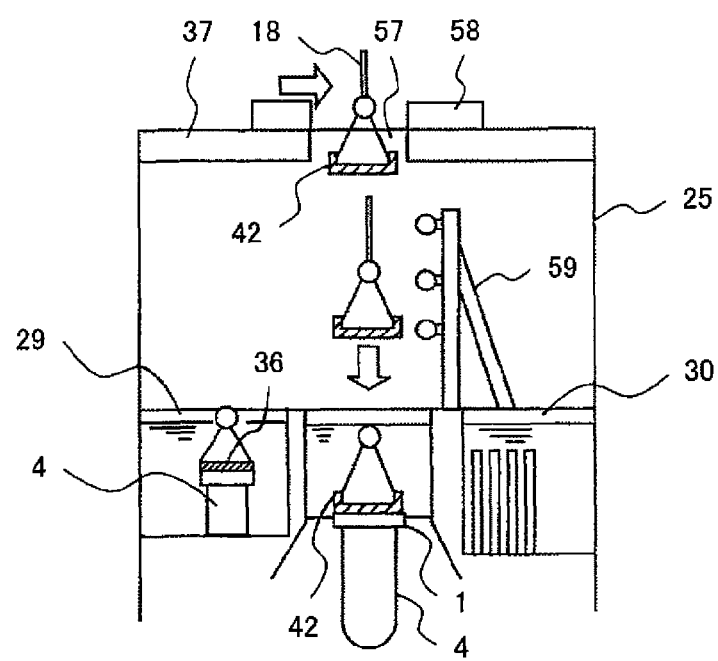
FIG. 42 is an explanatory drawing showing a state of carrying a cask bottom lid into a reactor building in step S21 shown in FIG. 36.
Figure 43:
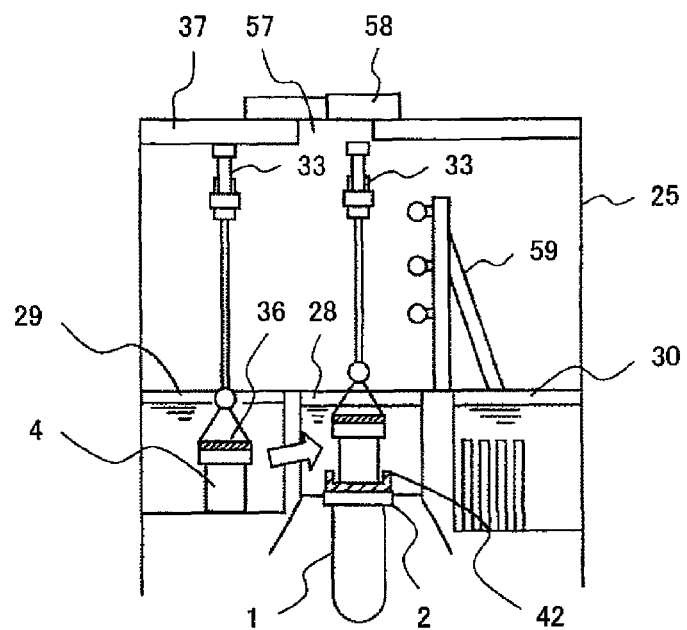
FIG. 43 is an explanatory drawing showing a state of carrying a core shroud from an equipment pool onto a reactor pressure vessel in step S22 shown in FIG. 36.

The steps S11 and S12 are executed. The cut core shroud 4, to the upper end portion of which the radiation shield plate 36 is attached, is transferred into the equipment pool 29 by the ceiling crane 33 as shown in FIG. 41 (step S20). The bottom lid 42 hoisted by the crane 18 is carried into the reactor building 25 through the opening portion 57 and put on the flange 2 of the RPV 1 as shown in FIG. 42 (step S21). The core shroud 4 in the equipment pool 29 is hoisted by the crane 33 and transferred onto the bottom lid 42 on the RPV 1 as shown in FIG. 43 (step S22).

Figure 44:
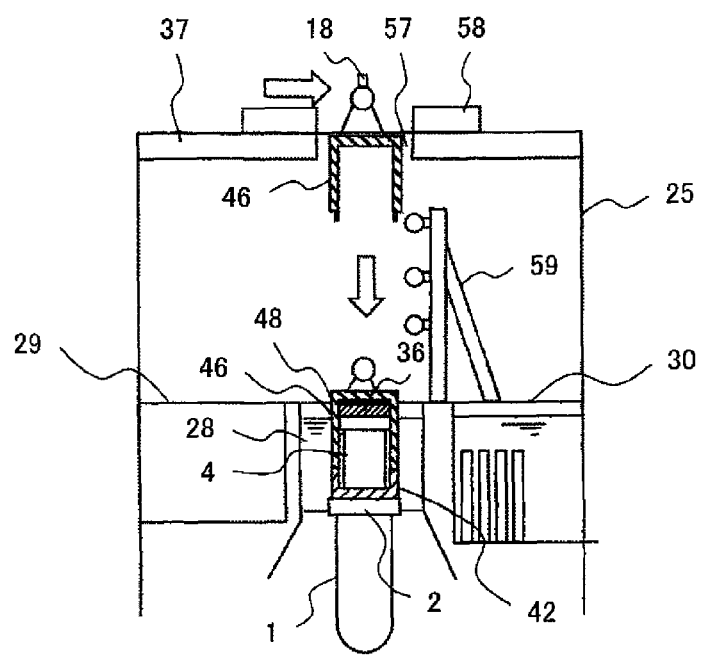
FIG. 44 is an explanatory drawing showing a state of carrying a cask shell in step S15 shown in FIG. 36.
Figure 45:
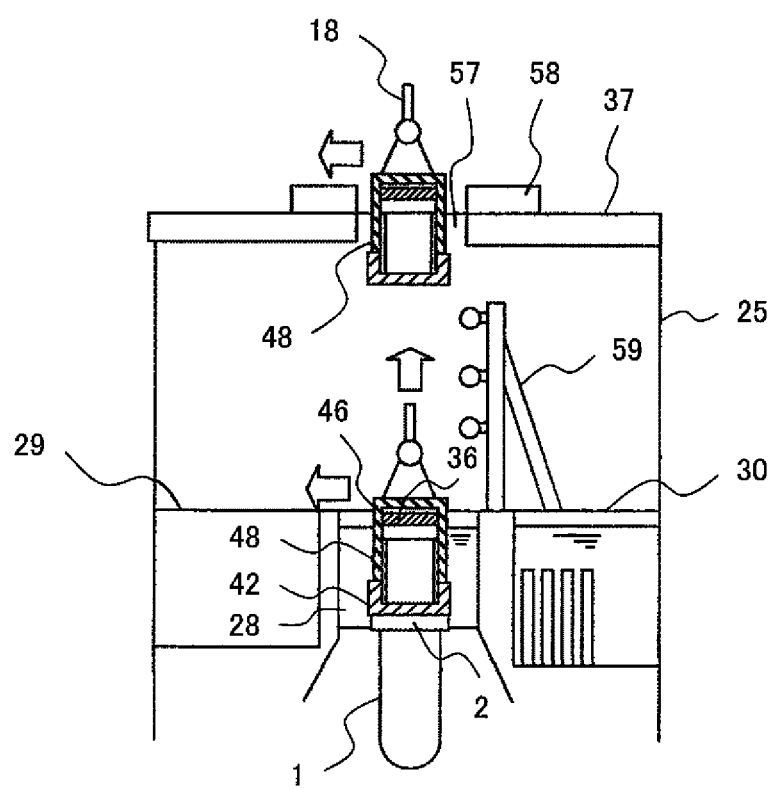
FIG. 45 is an explanatory drawing showing a state of carrying a core shroud being carried out in step S18 shown in FIG. 36.

The cask shell 46 hoisted by the crane 18 is carried into the reactor building 25 through the opening portion 57 as shown in FIG. 44 and covers the core shroud 4 placed on the bottom lid 42 (step S15). After that, the cask shell 46 are attached to the bottom lid 42 in the step S16, and water is drained from the cask 48 (step S17). Then, the core shroud 4 surrounded by the cask 48 is lifted by the crane 18 as shown in FIG. 45 and carried out of the reactor building 25 through the opening portion 57 (step S18). The core shroud 4 carried out is stored in the storage (step S19).

In the present embodiment, the bottom lid 42 and the cask shell 46 are joined while the cut core shroud 4 is put on the bottom lid 42 placed on the flange 2 of the RPV 1, and the cask shell 46 is put on the bottom lid 42, in the same manner as in the second embodiment. In the present embodiment also, all the weight of the core shroud 4, the bottom lid 42, and the cask shell 46 can be supported by the RPV 1 installed on the pedestal. Since this eliminates the need of setting up a new support member for supporting the cask 48 which is a radiation shield, the time required for carrying out the cut core shroud 4 can be reduced.

In the present embodiment, since the protection devices 59 are set up on the operation floor 27 between the reactor well 28 and the fuel storage pool 30, the core shroud 4 transferred from the reactor well 28 over the operation floor 27 can be prevented from falling into the fuel storage pool 30. No damage will occur to the fuel assemblies 10 in the fuel storage pool 30 when the core shroud 4 is carried out, and safety during the carry operation of the core shroud 4 is significantly improved. Since there is no need to transfer the fuel assemblies 10 to a fuel storage pool in another BWR plant, the time period for completing the carry operation of the core shroud 4 can be significantly reduced.

The radiation shield 36 installed on the upper end portion of the core shroud 4 can shield radiation from the core shroud 4 as described in the first embodiment. Furthermore, by using the hoist members (the hoist bolts 41) provided to the radiation shield 36, the cut core shroud 4 can be easily transferred.

The reactor internal equipments and piping to be disposed of along with the core shroud 4 can be carried out of the reactor building 25. This can reduce the time required for carrying out the removed reactor internal equipments and cut piping. Since the cut core shroud 4 is surrounded by the cask 48 which is a radiation shield, radiation to a worker can be prevented.

In the present embodiment, since the opening portion 57 in the ceiling 37 is formed directly above the RPV 1, the objects to be carried into the reactor building 25 or out of the reactor building 25 can be carried into or out by the crane 18. Since this eliminates the need of switching between the crane 18 and the ceiling crane 33 for hoisting these objects as in Embodiment 1, the time required to carry these objects can be reduced.

Fifth Embodiment

Figure 46:
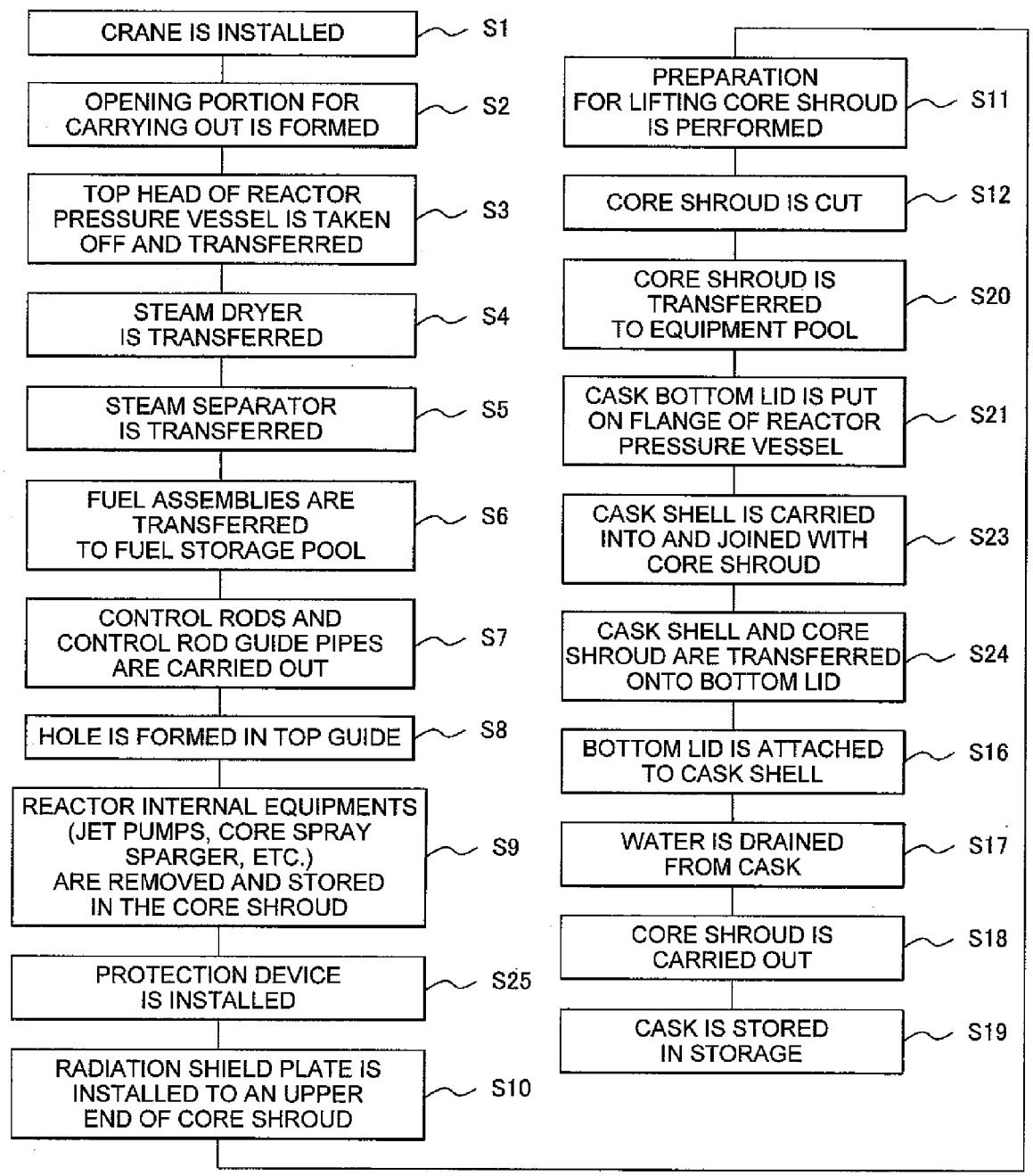
FIG. 46 is a flowchart showing operation procedures of a method for carrying out a reactor internal according to fifth embodiment which is another embodiment of the present invention.

A method for carrying out a reactor internal according to fifth embodiment, which is another embodiment of the present invention, will now be described below with reference to FIG. 46. The present embodiment also provides a method for carrying out a reactor internal applicable to a BWR plant, in which method, a core shroud is an object e carried out. In the present embodiment, steps S22 and S15 in all the steps executed in fourth embodiment are replaced by steps S23 and S24 executed in the third embodiment. In the present embodiment, each operation in the steps except for the steps S23 and S24 is the same as that in the fourth embodiment.

Figure 47:
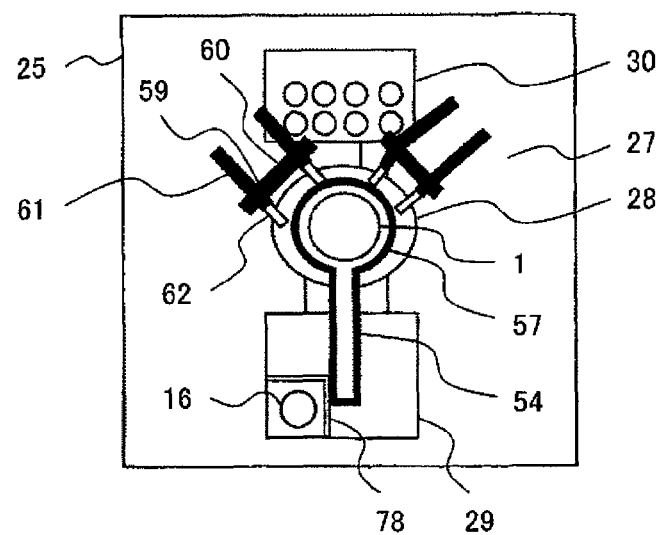
FIG. 47 is an explanatory drawing showing a placement of protection devices installed on an operation floor in step S25 shown in FIG. 46.
Figure 48:
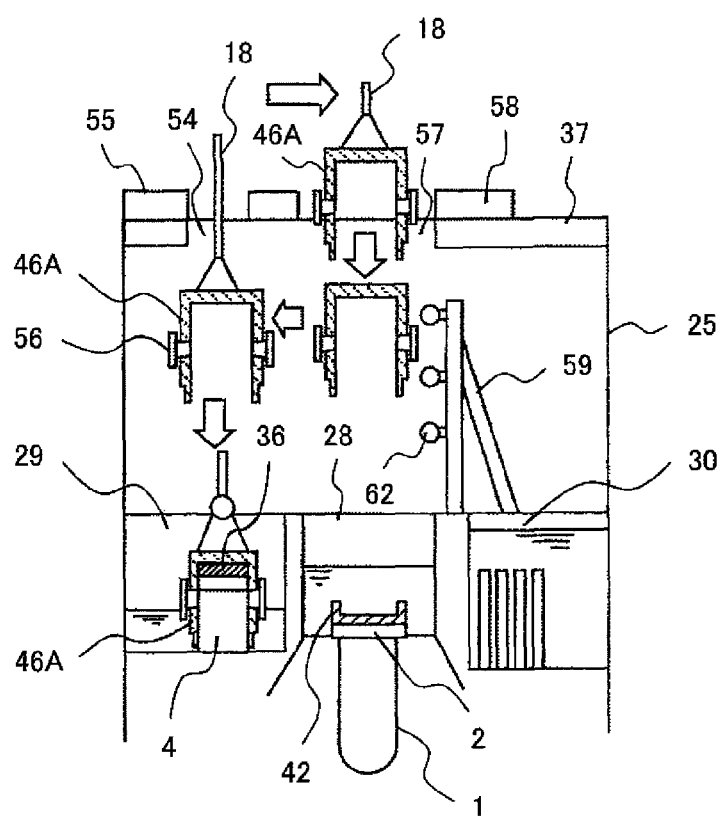
FIG. 48 is an explanatory drawing showing a state of carrying a cask shell into a reactor building, and fixing the cask shell to a core shroud in step S23 shown in FIG. 46.

After the step S1 is finished, the opening portion 57 and the long opening portion 54 are formed in the ceiling 37 of the reactor building 25 as shown in FIG. 47, which long opening portion 54 extends from the opening portion 57 to the position directly above the equipment pool 29 (step S2). The shutter 58 for opening and closing the opening portion 57 and the shutter 55 for opening and closing the opening portion 54 are provided to the ceiling 37 (see FIG. 48). In the present embodiment, the cask shell 46A and the core shroud 4 are carried into the reactor building 25 and out of the reactor building 25 not through the opening portion 54 but through the opening portion 57.

Figure 49:
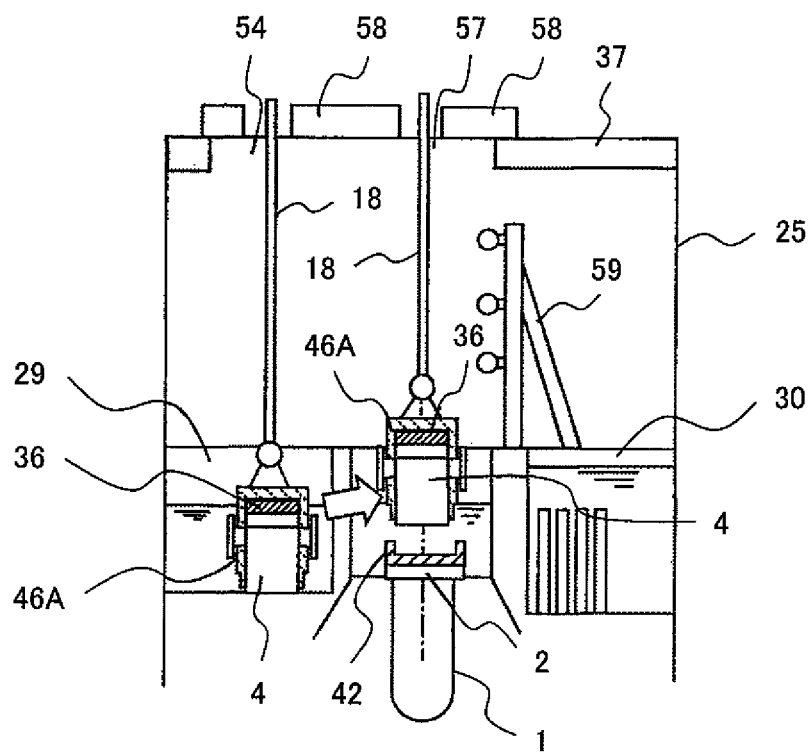
FIG. 49 is an explanatory drawing showing a state of carrying a cask shell and a core shroud in step S24 shown in FIG. 46.

Each operation of the steps S3 to S9, S25, S10 to S12, S20 and S21 is sequentially executed in the same manner as in the fourth embodiment. In the step 25, the two protection devices 59 are set up on the operation floor 27 as shown in FIG. 47. After the operation of the step S21 is finished, the cask shell 46A is carried into the reactor building 25 and joined with the core shroud 4 (step S23). The cask shell 46A hoisted by the crane 18 is carried into the reactor building 25 through the opening portion 57 and covers the core shroud 4 placed in the equipment pool 29 (see FIG. 48). The cask shell 46A and the core shroud 4 are joined with the two joining members (for example, bolts or pins) 56 in the same manner as in the third embodiment. The jointed cask shell 46A and core shroud 4 are transferred from the equipment pool 29 into the reactor well 28 as shown in FIG. 49, and put on the bottom lid 42 placed on the flange 2 of the RPV 1 (step S24). After that, each operation of the steps S16 to S19 is executed.

In the present embodiment, each effect produced in the fourth embodiment can be obtained. In addition, since the core shroud 4 and the cask shell 46A are carried from the equipment pool 29 onto the RPV 1 together, the present embodiment can reduce the time required for carrying the core shroud 4 and the cask shell 46A in the same manner as in the third embodiment. For this reason, the present embodiment can reduce the time required for carrying the core shroud 4 out of the reactor building 25 compared to the second embodiment.

Sixth Embodiment

A method for carrying out a reactor internal according to sixth embodiment, which is another embodiment of the present invention, will now be described below with reference to FIGS. 50 to 53. The present embodiment also provides a method for carrying out a reactor internal applicable to a BWR plant, in which method, a core shroud is an object carried out. In the present embodiment, the operations of all the steps in the first embodiment are executed. In the present embodiment, a hoist balance device 63 shown in FIG. 50 is used in the steps S10 to S19, and a shield wall (a shield member) 75 is set up on the operation floor 27, surrounding the reactor well 28 and the equipment pool 29.

Figure 50:
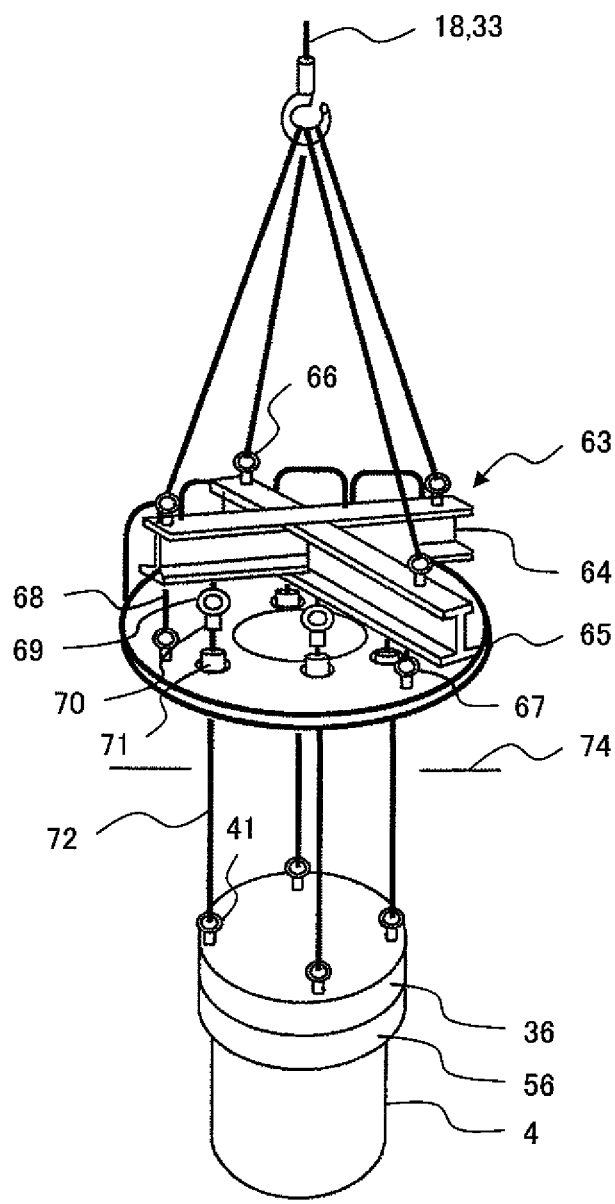
FIG. 50 is a perspective view of a hoist balance apparatus used in a method for carrying out a reactor internal according to sixth embodiment which is another embodiment of the present invention.
Figure 51:
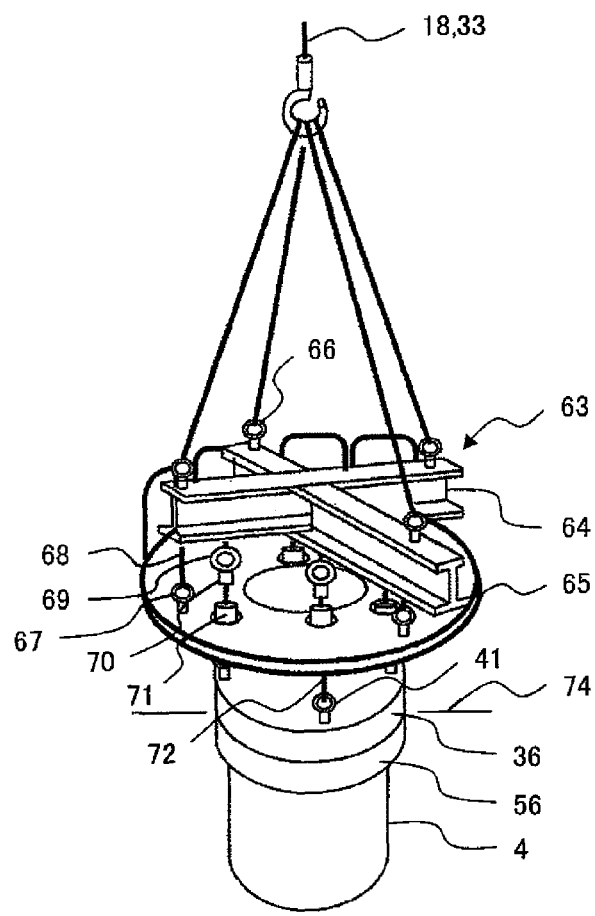
FIG. 51 is an explanatory drawing showing a state of hoisting a core shroud by a hoist balance device shown in FIG. 50.
Figure 54:
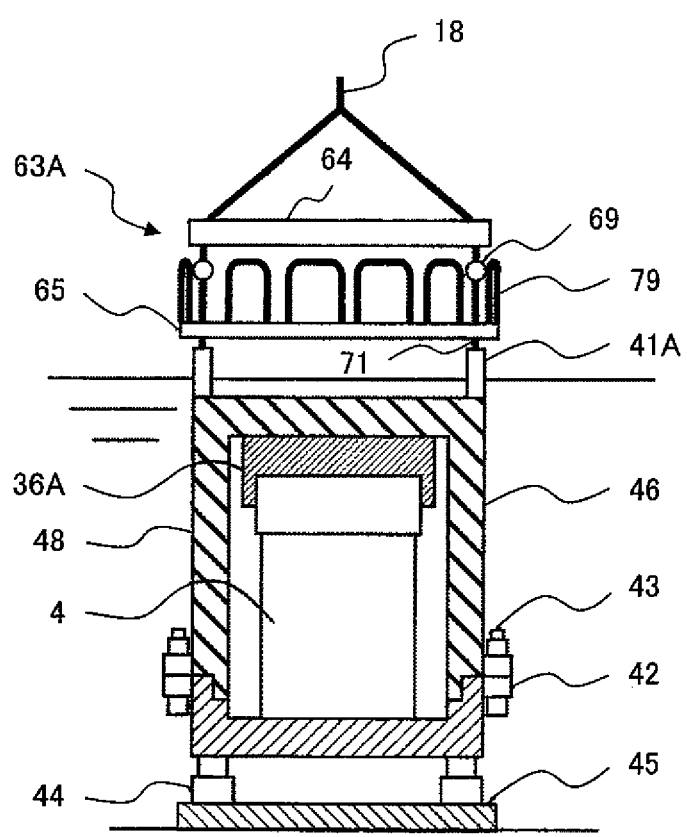
FIG. 54 is an explanatory drawing showing a state of carrying out a core shroud in a method for carrying out a reactor internal according to seventh embodiment which is another embodiment of the present invention.

The hoist balance device 63 comprises a balance member 64 made up of two crossing I-shaped beams, a disk-shaped radiation shield 65, compact cranes 69, and load cells 70 (see FIG. 50). The radiation shield 65 is hanged from the balance member 64 by attaching four wires 68 provided to the balance member 64 to four hoist rings 67 provided to the top surface of the shield 65. The diameter of the radiation shield 65 is larger than the diameter of the core shroud 4 to reduce radiation to a worker who stands on the radiation shield 65. The compact crane (for example, a chain block) 69 is provided to each under surface of the both end portions of the I-shaped beams of the balance member 64. The compact crane 69 is an elevating device. The load cell 70 is provided to each compact crane 69. A wire 72 attached to the load cell 70 extends below the radiation shield 65 through a sleeve 71 penetrating the radiation shield 65. The four wires 72 are attached to the respective hoist bolts (the hanging members) 41 provided to the radiation shield 36. Although not shown in FIGS. 50 and 51, a fence 79, shown in FIG. 54, is provided to the outer edge portion of the radiation shield 65 to prevent the worker standing on the radiation shield 65 from falling off. The load cells 70 measure the weight of the core shroud 4 to hoist.

Figure 52:
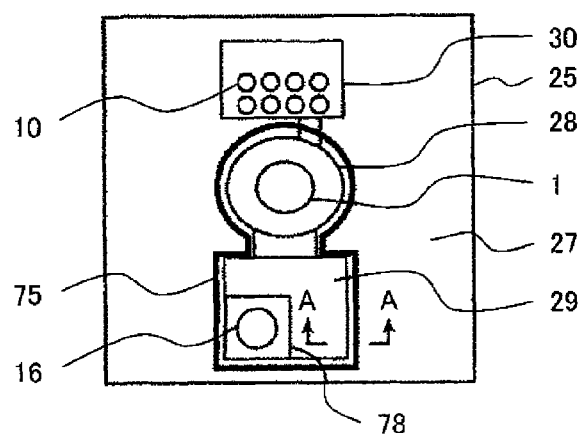
FIG. 52 is an explanatory drawing showing a shield wall installed around a reactor well and an equipment pool.
Figure 53:
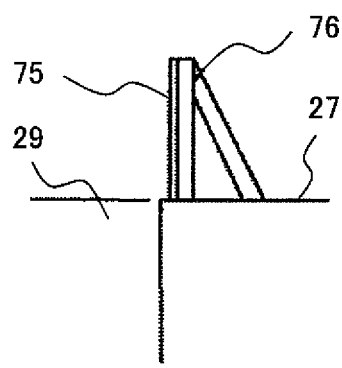
FIG. 53 is a sectional view taken along a line A-A of FIG. 52.

The shield wall 75 is made of radiation shielding material and set up on the operation floor 27 around the reactor well 28 and the equipment pool 29 (see FIGS. 52 and 53). The shield wall 75 is supported by support members 76 to prevent the shield wall 75 from falling. The shield wall 75 is set up on the operation floor 27 while, for example, when the opening portion is being formed in the step S2.

The hoist balance device 63 is hoisted by the ceiling crane 33 (or the crane 18) with wires attached to four hoist rings 66 provided on the top surface of the balance member 64. The core shroud 4 is lifted using the hoist balance device 63 in the step S14. The radiation shield 65 is also used as a scaffold for a worker. Cooling water in the reactor well 28 is drawn, and a water surface 74 of the cooling water is lower than the radiation shield 65. The worker standing on the radiation shield 65 operates the four compact cranes 69 to reel each wire 72, and the core shroud 4 is lifted (see FIG. 51). Then, the core shroud 4 is transferred to the equipment pool 29 (Step S14).

In the present embodiment also, each effect produced in the first embodiment can be obtained. In the present embodiment, since the shield wall 75 surrounds the reactor well 28 and the equipment pool 29, radiation to the worker standing on the operation floor 27 can be restrained when the core shroud 4 is transferred from the reactor well 28 to the equipment pool 29.

The hoist balance device 63 can be used in the step S20 of the second, fourth, and fifth embodiments, and in the step S14 of the third embodiment. The installation of the shield wall 75 can also be applied to any of the second, third, fourth, and fifth embodiments.

Seventh Embodiment

A method for carrying out a reactor internal according to seventh embodiment, which is another embodiment of the present invention, will now be described below with reference to FIG. 54. The present embodiment also provides a method for carrying out a reactor internal applicable to a BWR plant, in which method, a core shroud is an object carried out. In the present embodiment, the operations of all the steps in the first embodiment are executed. In the present embodiment, a hoist balance device 63A shown in FIG. 54 is used in the steps S10 to S19.

The hoist balance device 63A has hoist bolts (hanging members) 41A instead of the hoist bolts 41 in the hoist balance device 63 used in the sixth embodiment. Although FIG. 54 does not show everything, the other structure of the hoist balance device 63A is the same as the hoist balance device 63. The fence 79 is provided to the outer edge portion of the radiation shield 65 to prevent a worker standing on the radiation shield 65 from falling off.

The hoist bolts 41A used in the present embodiment are longer than the hoist bolts 41. The hoist bolts 41A set up on the top surface of the cask 48 which is supported by the jacks 44 put on the bottom of the equipment pool 29, more specifically, on the top surface of the cask shell 46 of the cask 48, protrude upward above the water surface in the equipment pool 29.

Furthermore in the present embodiment, a radiation shield plate 36A is placed on the upper end of the core shroud 4. While the radiation shield plate 36 used in each of the above embodiments is flat, the radiation shield plate 36A has a cylindrical portion protruding downward from the outer edge portion. When the radiation shield 36A is placed on top of the core shroud 4, the cylindrical portion of the radiation shield 36A surrounds the upper end portion of the side wall of the core shroud 4.

In the present embodiment, each effect produced in the first embodiment can be obtained. In the present embodiment, since the hoist bolts 41A protrude above the water surface in the equipment pool 29, the wires hanged from the compact cranes 69, attached to the hoist bolts 41A can be prevented from being submerged in the water. Since the wires are prevented from being submerged in the water, tiny gaps between the numerous thin lines of each wire will not be contaminated by radioactive material contained in the water. If the radioactive material gets into the space between those thin lines of the wire, removal of the radioactive material will be difficult. In addition, in the present invention which uses the radiation shield plate 36A, not only that the top of the core shroud 4 is covered by the radiation shield plate 36A but also that the upper end portion of the side wall of the core shroud 4 is surrounded by the cylindrical portion of the radiation shield 36A. Therefore, the radiation released from the side wall portion of the core shroud 4 toward the operation floor 27 near the water surface can be shielded.

The radiation shield plate 36A may be used in place of the radiation shield plate 36 in previously-described the first, second, third, fourth, fifth, and sixth embodiments and the eighth, ninth, tenth embodiments to be described later. The cask 48 having the hoist bolts 41A can be applied to the first, second, third, fourth, fifth, and sixth embodiments.

Eighth Embodiment

Figure 55:
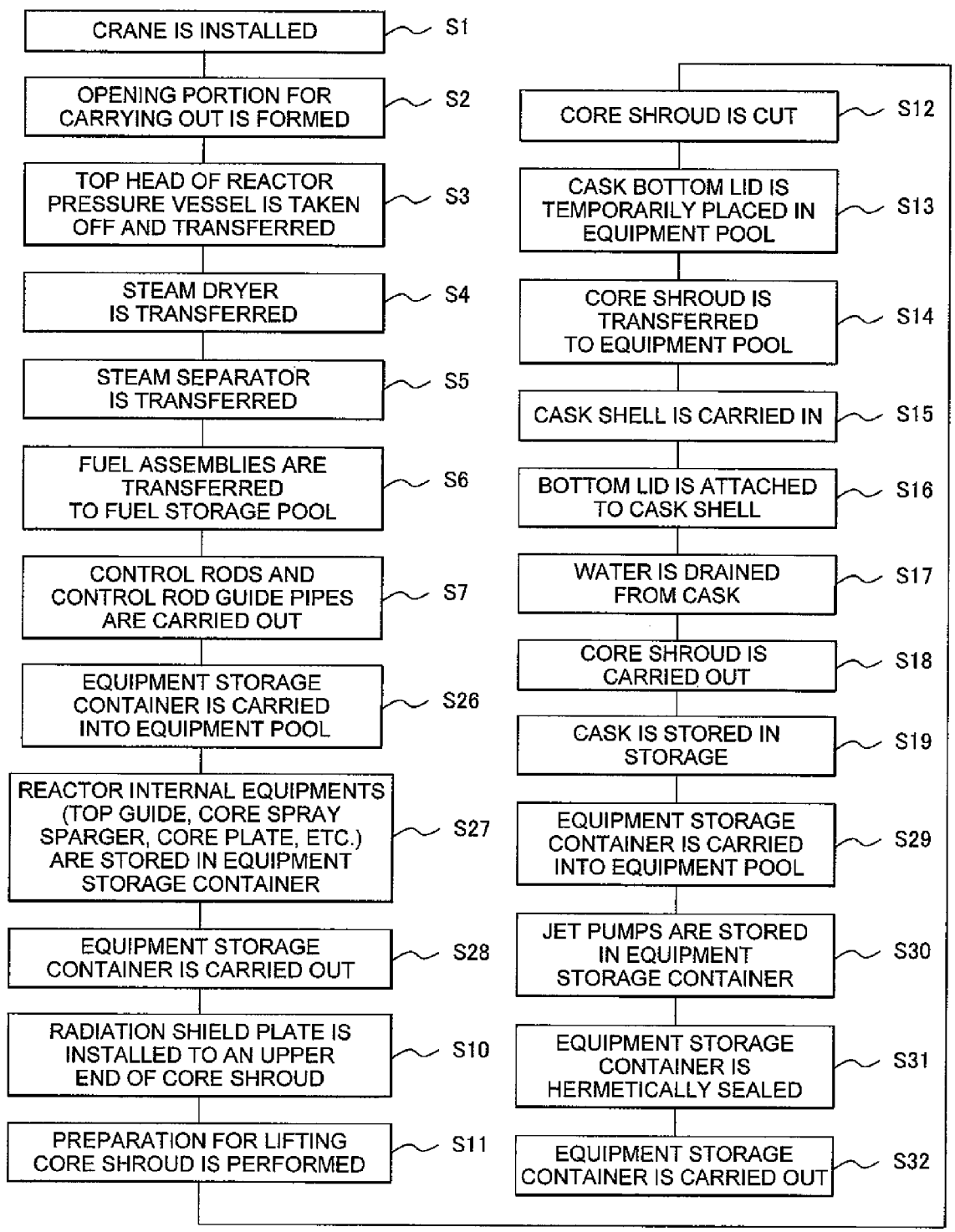
FIG. 55 is a flowchart showing operation procedures of a method for carrying out a reactor internal according to eighth embodiment which is another embodiment of the present invention.

A method for carrying out a reactor internal according to eighth embodiment, which is another embodiment of the present invention, will now be described below with reference to FIG. 55. The present embodiment also provides a method for carrying out a reactor internal applicable to a BWR plant, in which method, a core shroud is an object carried out. The present embodiment includes the operation steps in which, steps S26 to S28 are executed instead of the steps S9 and S10 in the steps executed in the first embodiment, and new steps S29 to S32 are added after the step S19. Each operation of the steps S1 to S19 in the present embodiment is the same as that in the first embodiment. Only the operations different from the first embodiment are described below.

Figure 56:
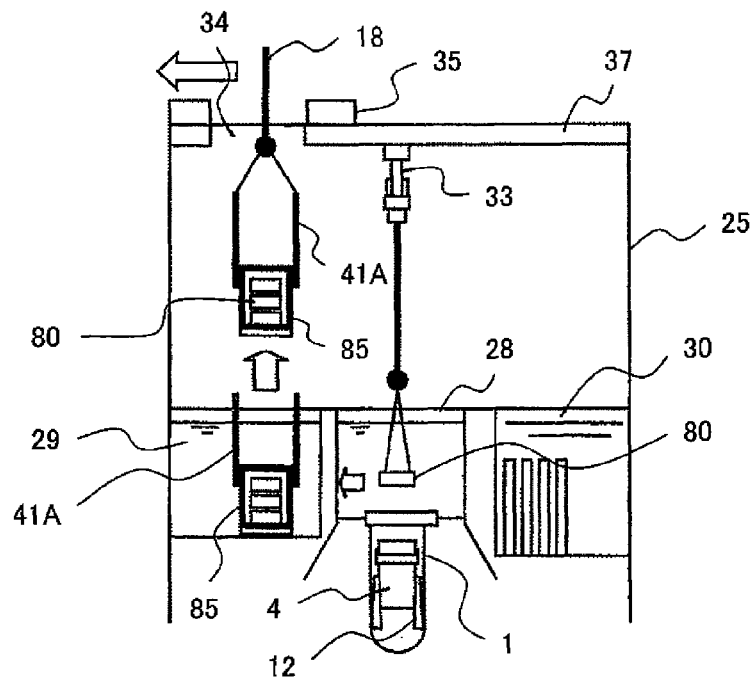
FIG. 56 is an explanatory drawing showing a state of carrying out an equipment storage container in step S28 shown in FIG. 55.

After the operation of the step S7 is finished, an equipment storage container is carried into the equipment pool (step S26). An equipment storage container 85 (see FIG. 56) hoisted by the crane 18 is carried into the equipment pool 29 through the opening portion 34 formed in the ceiling 37 of the reactor building 25. This equipment storage container 85 is put outside the separation wall 78 in the equipment pool 29. A reactor internal equipment is stored in the equipment storage container (step S27). The top guide 9, the core spray sparger 20, and the core plate 8 provided in the core shroud 4 are removed and sequentially taken out from the RPV 1 by the ceiling crane 33. At this time, no jet pump 12 is removed. The top guide 9, the core spray sparger 20, and the core plate 8 provided in the core shroud 4 are a reactor internal equipment 80 respectively. Each of the reactor internal equipments 80 taken out from the RPV 1 is sequentially stored in the equipment storage container 85 in the equipment pool 29. The equipment storage container 85 storing the relevant reactor internal equipments 80 is hermetically sealed with a lid. The equipment storage container is carried out (Step S28). The equipment storage container 85 is hoisted by the crane 18 using hoist bolts 41A, and the equipment storage container 85 is hoisted from the equipment pool 29 by the crane 18 (see FIG. 56). This equipment storage container 85 is carried out of the reactor building 25 through the opening portion 34 and stored in the storage.

After that, each operation of Steps S10 to S19 performed in Embodiment 1 is executed. The operation of Step S13 may be executed concurrently with Steps S11 and S12 in the same manner as in Embodiment 1. However, in Step S18 of the present embodiment, the core shroud 4 containing no reactor internal equipment including a jet pump inside is carried out of the reactor building 25.

Figure 57:
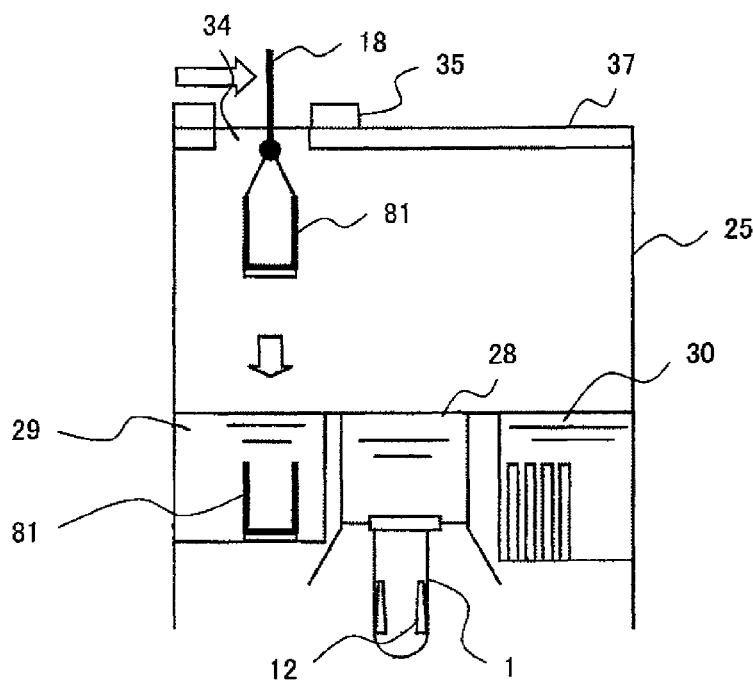
FIG. 57 is an explanatory drawing showing a state of carrying an equipment storage container into a reactor building in step S29 shown in FIG. 55.
Figure 58:
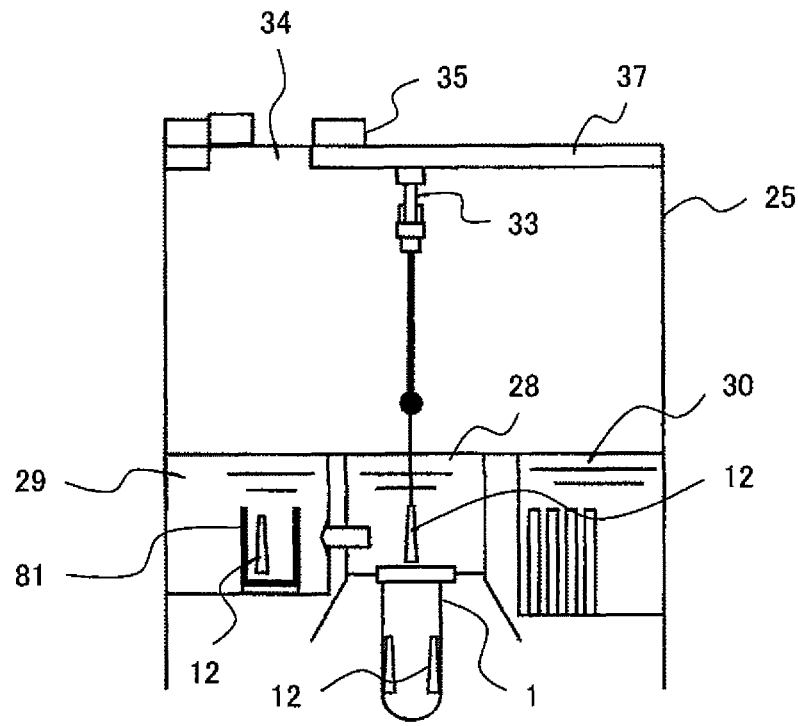
FIG. 58 is an explanatory drawing showing a state of storing jet pumps in an equipment storage container in step S30 shown in FIG. 55.
Figure 59:
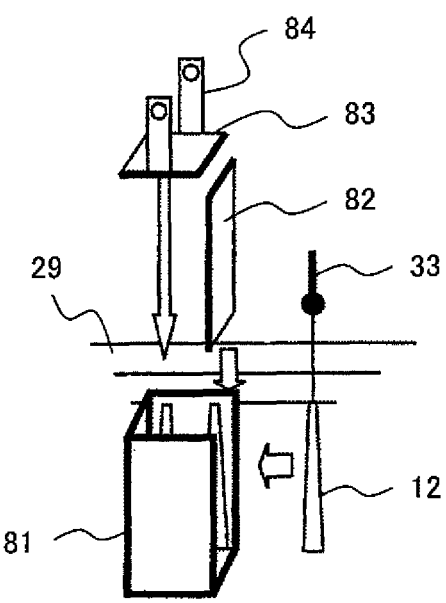
FIG. 59 is a detailed explanatory drawing showing a state of storing jet pumps in an equipment storage container, and sealing the equipment storage container shown in FIG. 58.
Figure 60:
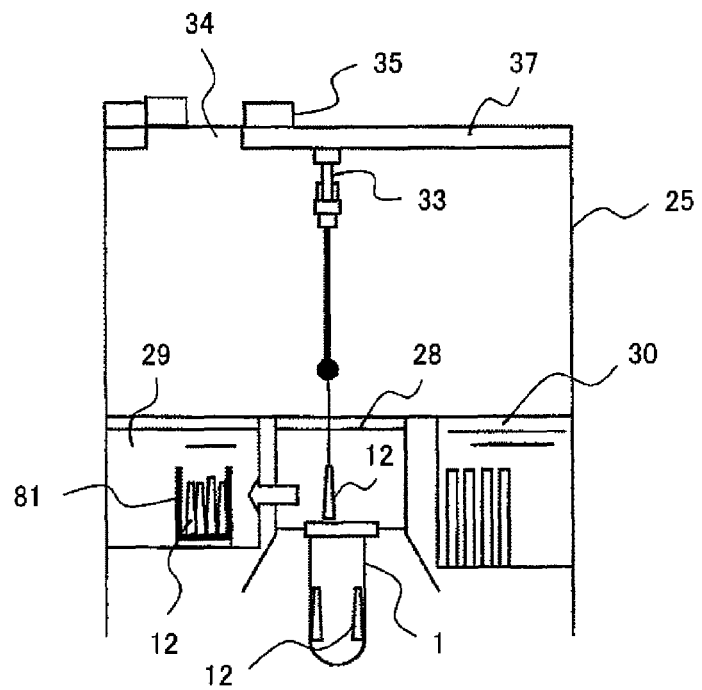
FIG. 60 is an explanatory drawing showing a state of storing sequentially jet pumps in an equipment storage container in step S30 shown in FIG. 55.

After the operation of the step S19 is finished, each operation of the steps S29 to S32 is sequentially executed. An equipment storage container is carried into the equipment pool (step S29). An equipment storage container 81 for storing the jet pumps 12 is carried into the equipment pool 29 through the opening portion 34 formed in the ceiling 37 using the crane 18 (see FIG. 57). This equipment storage container 81 is put outside the separation wall 78 in the equipment pool 29 in the same manner as the equipment storage container 85. The jet pumps are stored in the equipment storage container (step S30). The jet pumps 12 provided in the RPV 1 are removed, and the removed jet pumps 12 are taken out from the RPV 1 in the upward direction by the ceiling crane 33. These jet pumps 12 are transferred from the reactor well 28 into the equipment pool 29, and stored in the equipment storage container 81 from the horizontal direction (see FIG. 58). As shown in FIG. 59, one of the side walls and the top side of the equipment storage container 81 are open. This allows the jet pumps 12 hoisted by the ceiling crane 33 to be transferred horizontally and to be easily stored in the equipment storage container 81 through the open side of the side walls. Since the top side is open, wires from the ceiling crane 33 hanging the jet pumps 12 do not touch the equipment storage container 81. In addition, since the jet pumps 12 can be stored in the equipment storage container 81 from the horizontal direction, radiation released from the jet pumps 12 can be significantly suppressed from reaching above the water surface in the equipment pool 29. A plurality of jet pumps 12 provided in the RPV 1 are sequentially stored in the equipment storage container 81 (see FIGS. 59 and 60). The jet pumps 12 provided in the RPV 1 are the reactor internal equipments.

Figure 61:
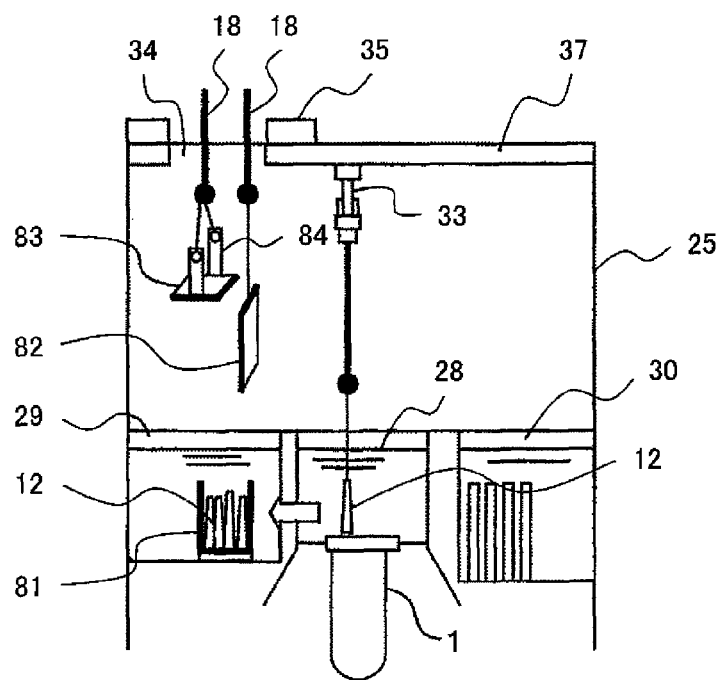
FIG. 61 is an explanatory drawing showing a state of sealing an equipment storage container in step S31 shown in FIG. 55.
Figure 62:
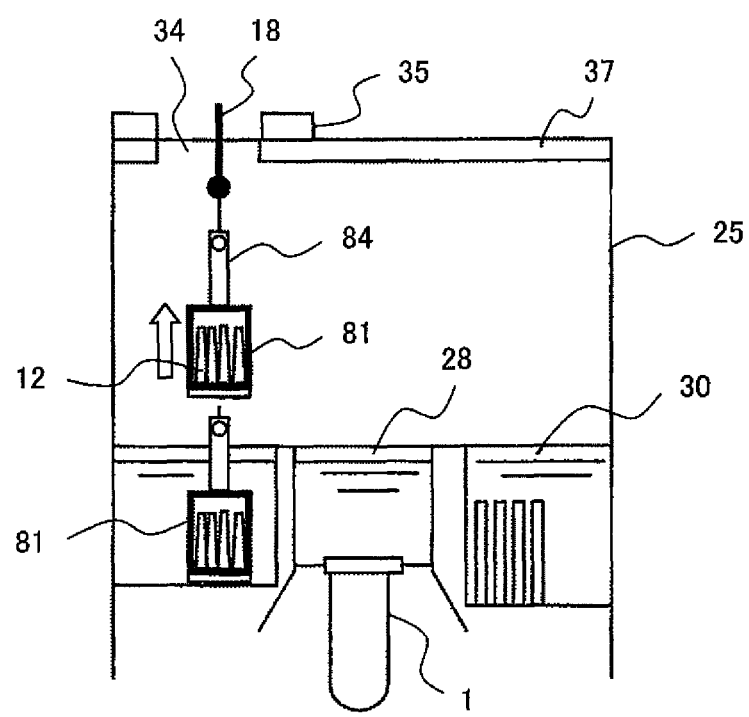
FIG. 62 is an explanatory drawing showing a state of carrying out an equipment storage container from a reactor building in step S32 shown in FIG. 55.

The equipment storage container is hermetically sealed (step S31). After the jet pumps 12 in the RPV 1 are all stored in the equipment storage container 81, the equipment storage container 81 is hermetically sealed. In order to hermetically seal the equipment storage container 81, a side wall 82 hoisted by the ceiling crane 33 is first installed to the open portion of the side walls of the equipment storage container 81. A top cover 83 hoisted by the ceiling crane 33 is installed to the upper end portion of the equipment storage container 81 with the side wall 82 already installed (see FIG. 61). When the top cover 83 is installed to the equipment storage container 81, hoist bolts 84 provided to the top cover 83 are hoisted by the ceiling crane 33. When the top cover 83 is installed to the equipment storage container 81, a hole for passing a wire in each of the hoist bolts 84 extending upward is above the liquid surface in the equipment pool 29. The equipment storage container is carried out of the reactor building (step S32). Wires attached to the crane 18 are passed through the holes in the hoist bolts 84 of the equipment storage container 81 placed in the equipment pool 29. The crane 18 lifts the equipment storage container 81 and carries it out of the reactor building 25 through the opening portion 34 (see FIG. 62). The carried-out equipment storage container 81 is stored in the storage in the same manner as the core shroud 4.

In the present embodiment, each effect produced in the first embodiment can be obtained except for the one produced by that the reactor internal equipments including the jet pumps 12 are stored in the core shroud 4. Since the reactor internal equipment 80 is stored in the equipment storage container 81 and carried out, the present embodiment eliminates the need of the hole forming operation to the top guide 9 executed in the step S8 in the first embodiment for carrying the core spray sparger 20 into the core shroud 4. In addition, in the present embodiment, the jet pumps 12 are removed from the RPV 1 and stored in the equipment storage container 81 after the core shroud 4 is carried out. This allows the jet pumps 12 to be easily removed from the RPV 1 because the core shroud 4 is not in the RPV 1.

The steps S26 to S32 executed in the present embodiment can be applied to each of previously-described the second, third, fourth, fifth, and sixth embodiments. In other words, the steps S26 to S28 can be executed instead of the steps S8 and S9, and the steps S29 to S32 can be added after the step S19 in each of the second, third, fourth, fifth, and sixth embodiments.

Ninth Embodiment

Figure 63:
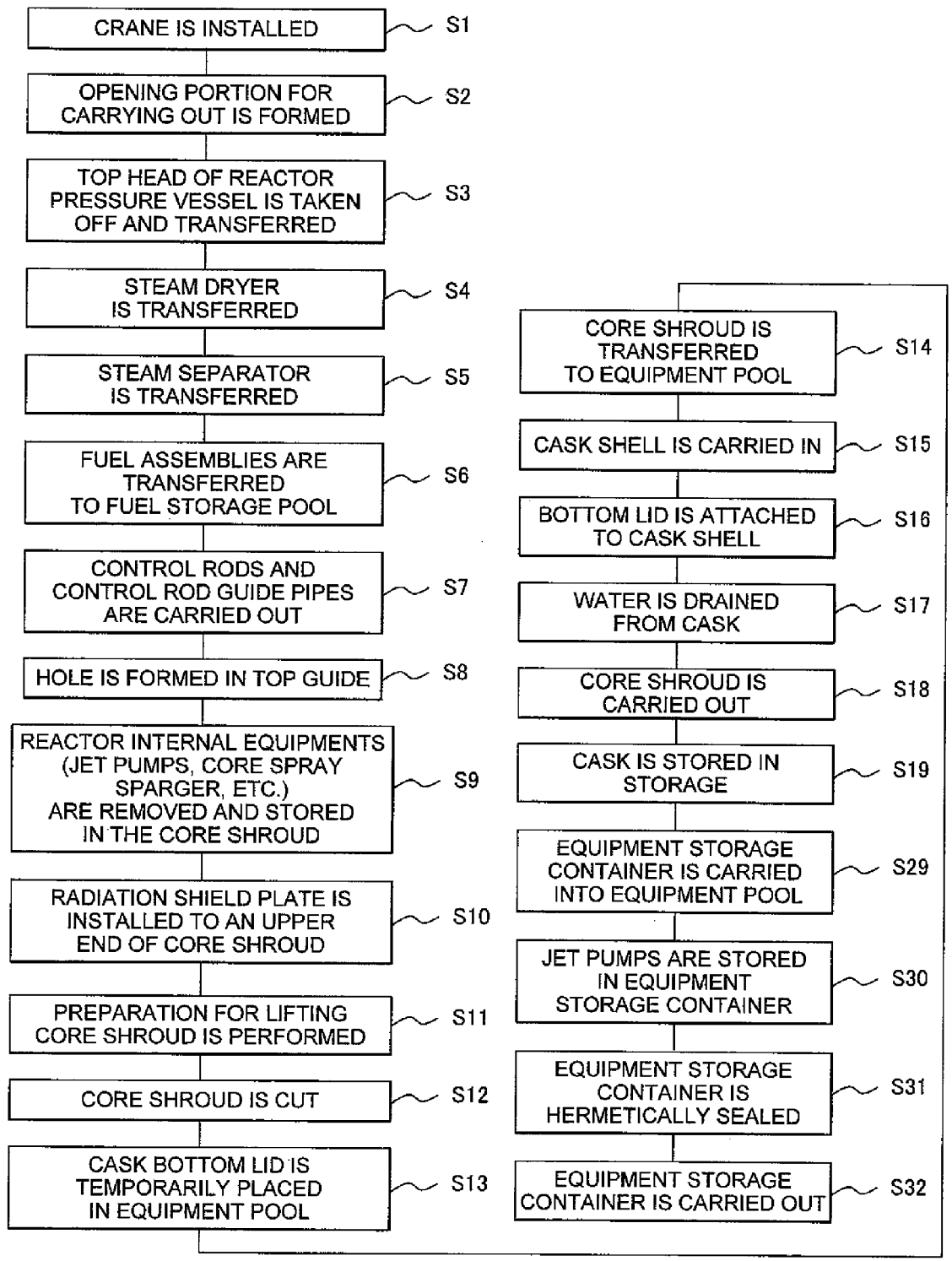
FIG. 63 is a flowchart showing operation procedures of a method for carrying out a reactor internal according to ninth embodiment which is another embodiment of the present invention.

A method for carrying out a reactor internal according to ninth embodiment, which is another embodiment of the present invention, will now be described below with reference to FIG. 63. The present embodiment also provides a carry method for a reactor internal applicable to a BWR plant, in which method, a core shroud is an object carried out. The present embodiment includes the operation steps in which, the steps S29 to S32 executed in the eighth embodiment are added to the steps executed in the first embodiment. Each operation of the steps S1 to S19 in the present embodiment is the same as that in the first embodiment. However, in the step S9, each of the reactor internal equipments (the top guide 9, core spray sparger 20, etc.) except for the jet pumps 12 is stored in the core shroud 4. The core shroud 4 storing these reactor internal equipments is carried out in the step S18.

In the present embodiment, each effect produced in the first embodiment can be obtained. The present embodiment also allows the jet pumps to be easily removed in the same manner as in the eighth embodiment.

The steps S29 to S32 can be applied to each of previously-described the second, third, fourth, fifth, and sixth embodiments in the same manner as in the present embodiment. In other words, the steps S29 to S32 can be added after the step S19 in each of the second, third, fourth, fifth, and sixth embodiments.

Tenth Embodiment

Figure 64:
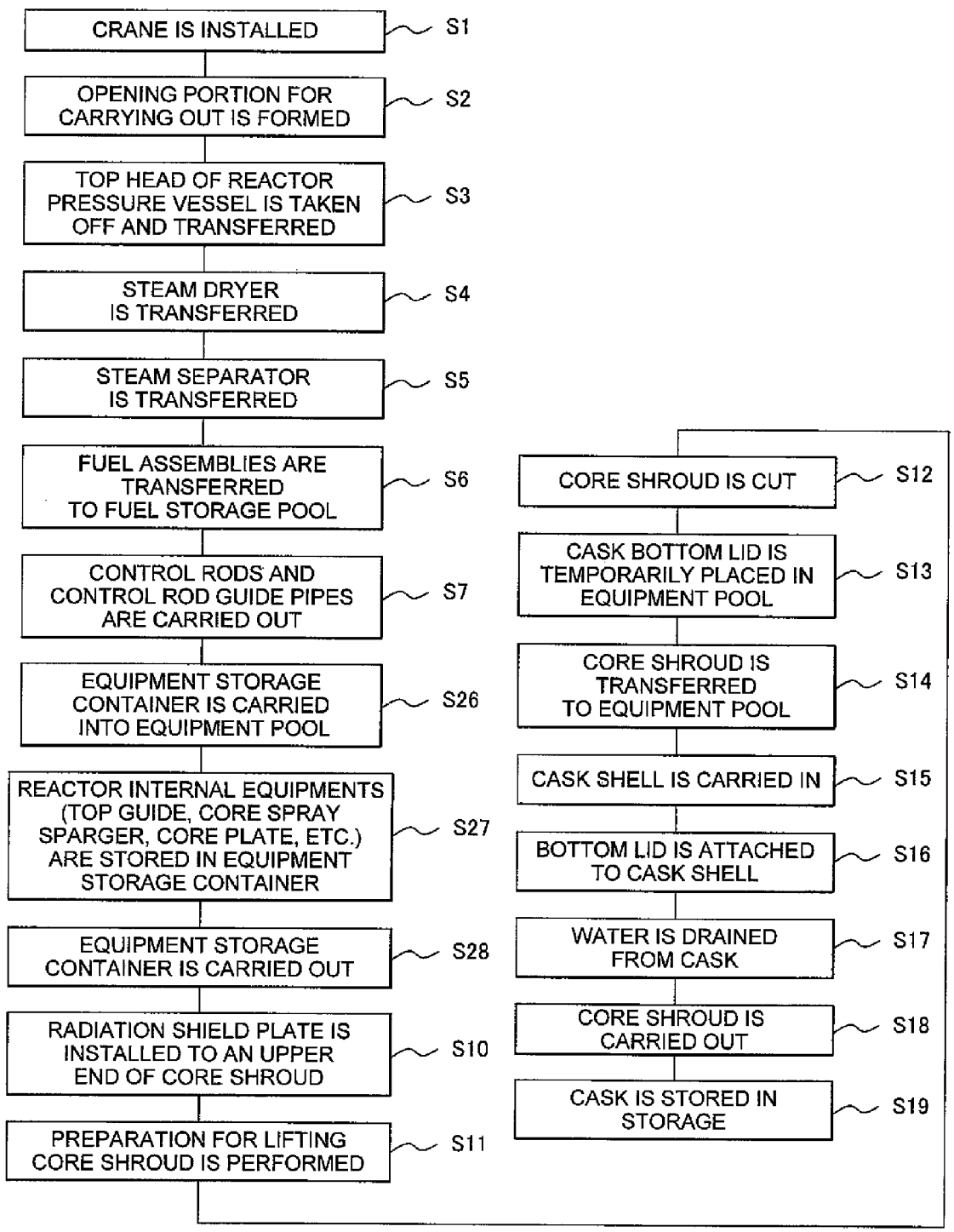
FIG. 64 is a flowchart showing operation procedures of a method for carrying out a reactor internal according to tenth embodiment which is another embodiment of the present invention.

A method for carrying out a reactor internal according to tenth embodiment, which is another embodiment of the present invention, will now be described below with reference to FIG. 64. The present embodiment also provides a method for carrying out a reactor internal applicable to a BWR plant, in which method, a core shroud is an object carried out. In the present embodiment, each of the operations in the eighth embodiment is executed except for the operations of the steps S29 to S32. In the step 27 in the present embodiment, the reactor internal equipments 80 stored in the step S27 of the eighth embodiment and the jet pumps 12 which are the other reactor internal equipments, are stored in the equipment storage container 85. The equipment storage container 85 storing the jet pumps 12 and the reactor internal equipments 80 is carried out of the reactor building 25 in the step S28.

In the present embodiment, each effect produced in the first embodiment can be obtained.

The steps S29 to S32 can be applied to each of previously-described the second, third, fourth, fifth, and sixth embodiments in the same manner as in the present embodiment. In other words, the steps S26 to S28 can be executed in place of Steps S8 and S9 in each of the second, third, fourth, fifth, and sixth embodiments.

What is claimed is:

1. A method for carrying out a reactor internal from a reactor pressure vessel of a boiling water reactor, comprising the steps of:
    forming a first opening portion in a ceiling of a reactor building in which said reactor pressure vessel of said boiling water reactor is disposed, the first opening portion being formed at a position directly above an equipment pool provided in said reactor building, said equipment pool being at a position in said reactor building spaced from said reactor pressure vessel;
    cutting a cylindrical reactor internal including a core shroud surrounding a core in said reactor pressure vessel disposed in said reactor building, in a circumferential direction of said cylindrical reactor internal, at one position in an axial direction while suspending said cylindrical reactor internal by a ceiling crane installed in said reactor building;
    surrounding said cut cylindrical reactor internal with a radiation shield; and
    carrying said cut cylindrical reactor internal surrounded by said radiation shield out of said reactor building through said first opening portion;
    wherein said step of surrounding said cut cylindrical reactor internal with said radiation shield comprises the steps of:
    transferring said cut cylindrical reactor internal from said reactor pressure vessel into said equipment pool by said ceiling crane;
    putting said cut cylindrical reactor internal transferred into said equipment pool on a bottom portion of said radiation shield which is placed in said equipment pool; and
    attaching said radiation shield to said cylindrical reactor internal within said equipment pool by joining an upper shell portion of said radiation shield covering a portion of said cut cylindrical reactor internal to said bottom portion of said radiation shield so as to have said cut cylindrical reactor internal surrounded by the joined upper shell portion and bottom portion of said radiation shield within said equipment pool.

2. The method for carrying out a reactor internal according to claim 1,
    wherein said step of joining said upper shell portion to said bottom portion comprises the steps of:

raising said bottom portion of said radiation shield on which said cylindrical reactor internal is placed while said upper shell portion of said radiation shield is hoisted; and joining said raised bottom portion of said radiation shield to said upper shell portion of said radiation shield.

3. The carry method for a reactor internal according to claim 1, wherein said step of surrounding said cut cylindrical reactor internal with said radiation shield comprises the steps of:

taking out said cut cylindrical reactor internal from said reactor pressure vessel and supporting said cylindrical reactor internal with a flange portion of said reactor pressure vessel; and attaching said radiation shield to said cut cylindrical reactor internal supported by said flange portion.

4. The method for carrying out a reactor internal according to claim 3, wherein said step of attaching said radiation shield to said cut cylindrical reactor internal supported by said flange portion comprises the steps of:

transferring said cut cylindrical reactor internal from said reactor pressure vessel into said equipment pool, putting said bottom portion of said radiation shield on said flange portion, putting said cut cylindrical reactor internal transferred from said equipment pool on a bottom portion of said radiation shield supported by flange portion, covering said cut cylindrical reactor internal with said upper shell portion of said radiation shield; and joining said upper shell portion of said radiation shield to said bottom portion of said radiation shield.

5. The method for carrying out a reactor internal according to claim 1, wherein said step of transferring said cut cylindrical reactor internal from said reactor pressure vessel into said equipment pool is performed by using said ceiling crane installed in said reactor building.

6. The method for carrying out a reactor internal according to claim 4, wherein said step of transferring said cut cylindrical reactor internal from said reactor pressure vessel into said equipment pool is performed by using said ceiling crane installed in said reactor building.

7. The method for carrying out a reactor internal according to claim 1, wherein a second opening portion narrower than said first opening portion is formed in said ceiling from said first opening portion to a position directly above said reactor pressure vessel.

8. The method for carrying out a reactor internal according to claim 4, wherein a second opening portion narrower than said first opening portion is formed in said ceiling from said first opening portion to a position directly above said reactor pressure vessel.

9. The method for carrying out a reactor internal according to claim 1, wherein a radiation shield member for covering an internal space of said cut cylindrical reactor internal is put on an upper end portion of said cut cylindrical reactor internal.

10. The method for carrying out a reactor internal according to claim 1, wherein at least one of reactor internal equipment and piping removed from said reactor pressure vessel is stored in said cut cylindrical reactor internal carried out of said reactor building.

11. The method for carrying out a reactor internal according to claim 1, wherein a reactor internal equipment provided in said cylindrical reactor internal is stored in a storage container in said reactor building; and said storage container storing said reactor internal equipment is carried out of said reactor building.

* * * * *